US012752255B2

(12) United States Patent
Woo et al.

(10) Patent No.: US 12,752,255 B2
(45) Date of Patent: Oct. 6, 2026

(54) PREPARATION METHOD OF SUPERABSORBENT POLYMER

(71) Applicant: LG CHEM, LTD., Seoul (KR)

(72) Inventors: Heechang Woo, Daejeon (KR); Gicheul Kim, Daejeon (KR); Yoon Jae Min, Daejeon (KR); Jinuk Choi, Daejeon (KR)

(73) Assignee: LG CHEM, LTD., Seoul (KR)

(*) Notice: Subject to any disclaimer, the term of this patent is extended or adjusted under 35 U.S.C. 154(b) by 414 days.

(21) Appl. No.: 18/031,703

(22) PCT Filed: Jun. 20, 2022

(86) PCT No.: PCT/KR2022/008682
§ 371 (c)(1),
(2) Date: Apr. 13, 2023

(87) PCT Pub. No.: WO2022/265466
PCT Pub. Date: Dec. 22, 2022

(65) Prior Publication Data

US 2023/0381744 A1 Nov. 30, 2023

(30) Foreign Application Priority Data

Jun. 18, 2021 (KR) ........................ 10-2021-0079644
Jun. 21, 2021 (KR) ........................ 10-2021-0080229
Jun. 20, 2022 (KR) ........................ 10-2022-0074633

(51) Int. Cl.
*B01J 20/28* (2006.01)
*B01J 20/26* (2006.01)
*C08F 220/06* (2006.01)
*C08J 3/12* (2006.01)
*C08J 3/24* (2006.01)
*C08K 5/101* (2006.01)

(52) U.S. Cl.
CPC ....... *B01J 20/28047* (2013.01); *B01J 20/261* (2013.01); *B01J 20/267* (2013.01); *B01J 20/28004* (2013.01); *C08F 220/06* (2013.01); *C08J 3/12* (2013.01); *C08J 3/245* (2013.01); *C08K 5/101* (2013.01); *B01J 2220/68* (2013.01)

(58) Field of Classification Search
CPC ................ B01J 20/261; B01J 20/28047; B01J 2220/68; B01J 20/267; B01J 20/28004; C08J 3/245; C08J 3/12; C08K 5/101; C08F 220/06
USPC .......................................................... 502/402
See application file for complete search history.

(56) References Cited

U.S. PATENT DOCUMENTS

| | | | |
|---|---|---|---|
| 311,626 | A | 2/1885 | Wilson |
| 351,617 | A | 10/1886 | Anderson |
| 1,122,055 | A | 12/1914 | Asbury |
| 2,218,119 | A | 10/1940 | Mcallister |
| 3,542,104 | A | 11/1970 | Anderson et al. |
| 3,779,565 | A | 12/1973 | Witte |
| 3,905,122 | A | 9/1975 | Ohshima et al. |
| 4,027,824 | A | 6/1977 | Fuller |
| 4,253,613 | A | 3/1981 | Reinhall |
| 4,269,362 | A | 5/1981 | Berggren |
| 4,497,930 | A | 2/1985 | Yamasaki et al. |
| RE32,649 | E | 4/1988 | Brandt et al. |
| 4,844,372 | A | 7/1989 | Weiler et al. |
| 4,883,478 | A | 11/1989 | Lerailler et al. |
| 4,908,101 | A | 3/1990 | Frisk et al. |
| 5,042,726 | A | 8/1991 | Reinhall |
| 5,629,034 | A | 5/1997 | Terada et al. |
| 5,633,329 | A | 5/1997 | Hahnle et al. |
| 5,686,698 | A | 11/1997 | Mahadevan et al. |
| 5,837,789 | A | 11/1998 | Stockhausen et al. |
| 5,875,982 | A | 3/1999 | Underberg |
| 6,060,557 | A | 5/2000 | Dahmen et al. |
| 6,133,193 | A | 10/2000 | Kajikawa et al. |
| 6,229,062 | B1 | 5/2001 | Mandell et al. |
| 6,299,084 | B1 | 10/2001 | Virving |
| 6,325,308 | B1 | 12/2001 | Lofgren et al. |
| 6,914,105 | B1 | 7/2005 | Charpentier et al. |
| 8,785,583 | B2 | 7/2014 | Funk et al. |
| 8,829,135 | B2 | 9/2014 | Funk et al. |
| 9,803,033 | B2 | 10/2017 | Funk et al. |
| 10,730,028 | B2 | 8/2020 | Kotake et al. |
| 2001/0025093 | A1 | 9/2001 | Ishizaki et al. |
| 2003/0071153 | A1 | 4/2003 | Aikawa |
| 2004/0092688 | A1 | 5/2004 | Dairoku et al. |
| 2004/0181031 | A1 | 9/2004 | Nogi et al. |

(Continued)

FOREIGN PATENT DOCUMENTS

| | | | |
|---|---|---|---|
| CH | 604894 | A5 | 9/1978 |
| CN | 2327443 | Y | 7/1999 |

(Continued)

OTHER PUBLICATIONS

Extended European Search Report dated Aug. 19, 2024, of the corresponding European Patent Application No. 22825394.4.
Extended European Search Report dated Sep. 16, 2024, of the corresponding European Patent Application No. 22825396.9.
Extended European Search Report dated Sep. 26, 2024, of the corresponding European Patent Application No. 22825395.1.
International Search Report and Written Opinion dated Oct. 7, 2022, issued in corresponding International Patent Application No. PCT/KR2022/008682.

(Continued)

*Primary Examiner* — Anthony J Zimmer
*Assistant Examiner* — Annette Phan
(74) *Attorney, Agent, or Firm* — Morgan, Lewis & Bockius LLP

(57) ABSTRACT

Provided is a method for preparing a superabsorbent polymer. More particularly, provided is a method for preparing a superabsorbent polymer exhibiting remarkably reduced water-soluble components and generation of fine particles and exhibiting excellent absorption properties.

16 Claims, No Drawings

(56) References Cited

U.S. PATENT DOCUMENTS

| | | | |
|---|---|---|---|
| 2004/0242764 | A1 | 12/2004 | Yamada et al. |
| 2009/0208748 | A1 | 8/2009 | Torii et al. |
| 2010/0249320 | A1 | 9/2010 | Matsumoto et al. |
| 2011/0290920 | A1 | 12/2011 | Kim et al. |
| 2011/0319518 | A1 | 12/2011 | Kadonaga et al. |
| 2012/0108695 | A1 | 5/2012 | Won et al. |
| 2012/0157625 | A1 | 6/2012 | Kitano et al. |
| 2012/0157635 | A1 | 6/2012 | Nogi et al. |
| 2012/0157650 | A1 | 6/2012 | Nogi et al. |
| 2012/0172536 | A1 | 7/2012 | Nogi et al. |
| 2012/0202952 | A1 | 8/2012 | Funk et al. |
| 2012/0258851 | A1 | 10/2012 | Nakatsuru et al. |
| 2012/0289607 | A1 | 11/2012 | Xiong et al. |
| 2012/0315675 | A1 | 12/2012 | Medoff et al. |
| 2013/0026412 | A1 | 1/2013 | Machida et al. |
| 2014/0241108 | A1 | 8/2014 | Stöppler |
| 2014/0339344 | A1 | 11/2014 | Kim et al. |
| 2014/0371400 | A1 | 12/2014 | Tachi et al. |
| 2015/0136888 | A1 | 5/2015 | Matsumoto et al. |
| 2016/0199529 | A1 | 7/2016 | Torii et al. |
| 2016/0208022 | A1 | 7/2016 | Kim et al. |
| 2016/0311985 | A1 | 10/2016 | Jung et al. |
| 2017/0029546 | A1 | 2/2017 | Langlotz |
| 2017/0081442 | A1 | 3/2017 | Johnson et al. |
| 2017/0267793 | A1 | 9/2017 | Imura et al. |
| 2018/0298132 | A1 | 10/2018 | Yorino et al. |
| 2019/0001302 | A1 | 1/2019 | Shuto et al. |
| 2019/0105628 | A1 | 4/2019 | Kotake et al. |
| 2019/0201868 | A1 | 7/2019 | Wakabayashi et al. |
| 2019/0224645 | A1 | 7/2019 | Kim et al. |
| 2019/0275192 | A1 | 9/2019 | Torii et al. |
| 2019/0276609 | A1 | 9/2019 | Lee et al. |
| 2019/0329219 | A1* | 10/2019 | Watabe .................... F26B 3/20 |
| 2019/0329220 | A1 | 10/2019 | Watabe et al. |
| 2019/0338082 | A1 | 11/2019 | Iwamura et al. |
| 2020/0246222 | A1 | 8/2020 | Malanga et al. |
| 2020/0316549 | A1 | 10/2020 | Kotake et al. |
| 2020/0393318 | A1 | 12/2020 | Okawa et al. |
| 2020/0398253 | A1 | 12/2020 | Kawada et al. |
| 2020/0406228 | A1 | 12/2020 | Min et al. |
| 2021/0009725 | A1 | 1/2021 | Nam et al. |
| 2021/0115198 | A1 | 4/2021 | Yorino et al. |
| 2021/0147637 | A1 | 5/2021 | Matsumoto et al. |
| 2021/0147640 | A1 | 5/2021 | Hur et al. |
| 2021/0230316 | A1 | 7/2021 | Won et al. |
| 2021/0269606 | A1 | 9/2021 | Wakabayashi et al. |
| 2021/0317237 | A1 | 10/2021 | Chung et al. |
| 2021/0340301 | A1 | 11/2021 | Kim et al. |
| 2021/0347924 | A1 | 11/2021 | El-Toufaili et al. |
| 2022/0111352 | A1 | 4/2022 | Kimura et al. |
| 2022/0193626 | A1 | 6/2022 | Enomura |
| 2022/0234015 | A1 | 7/2022 | Enomura |
| 2022/0258380 | A1 | 8/2022 | Choi et al. |
| 2022/0379521 | A1 | 12/2022 | Woo et al. |
| 2023/0097487 | A1 | 3/2023 | Yorino et al. |
| 2023/0338925 | A1 | 10/2023 | Chung et al. |
| 2023/0381788 | A1 | 11/2023 | Chung et al. |
| 2025/0196155 | A1 | 6/2025 | Jöchner et al. |

FOREIGN PATENT DOCUMENTS

| | | | |
|---|---|---|---|
| CN | 2480050 | Y | 3/2002 |
| CN | 1872890 | A | 12/2006 |
| CN | 101878816 | A | 11/2010 |
| CN | 201728110 | U | 2/2011 |
| CN | 102482433 | A | 5/2012 |
| CN | 102639229 | A | 8/2012 |
| CN | 113828181 | B | 9/2013 |
| CN | 103958039 | A | 7/2014 |
| CN | 104028718 | A | 9/2014 |
| CN | 104207258 | A | 12/2014 |
| CN | 105452306 | A | 3/2016 |
| CN | 107029575 | A | 8/2017 |
| CN | 207533357 | U | 6/2018 |
| CN | 108554595 | A | 9/2018 |
| CN | 109843934 | A | 6/2019 |
| CN | 210787668 | U | 6/2020 |
| CN | 210880398 | U | 6/2020 |
| CN | 112204091 | A | 1/2021 |
| CN | 212396873 | U | 1/2021 |
| CN | 112839993 | A | 5/2021 |
| DE | 2931275 | A1 | 2/1980 |
| DE | 10017899 | A1 | 10/2001 |
| DE | 20 2014 105 679 | U1 | 1/2015 |
| EP | 0096790 | A1 | 12/1983 |
| EP | 0648537 | A1 | 4/1995 |
| EP | 0778370 | A1 | 6/1997 |
| EP | 1 130 045 | A2 | 9/2001 |
| EP | 1147804 | A1 | 10/2001 |
| EP | 1302590 | A1 | 4/2003 |
| EP | 2189478 | A1 | 5/2010 |
| EP | 2557095 | A1 | 2/2013 |
| EP | 3312218 | A1 | 4/2018 |
| EP | 3473664 | A1 | 4/2019 |
| EP | 3521343 | A1 | 8/2019 |
| EP | 3543279 | A1 | 9/2019 |
| EP | 3543280 | A1 | 9/2019 |
| EP | 3711722 | A1 | 9/2020 |
| EP | 3757153 | A1 | 12/2020 |
| EP | 3795616 | A1 | 3/2021 |
| EP | 3812420 | A1 | 4/2021 |
| EP | 3842477 | A1 | 6/2021 |
| EP | 3939756 | A1 | 1/2022 |
| EP | 3984711 | A1 | 4/2022 |
| EP | 4000736 | A1 | 5/2022 |
| EP | 4 197 639 | A1 | 6/2023 |
| EP | 4253451 | A1 | 10/2023 |
| EP | 4 321 559 | A1 | 2/2024 |
| EP | 4324868 | A1 | 2/2024 |
| EP | 4 332 121 | A1 | 3/2024 |
| EP | 4393991 | A1 | 7/2024 |
| FR | 2679789 | A1 | 2/1993 |
| GB | 2536502 | A | 9/2016 |
| JP | S59-030826 | A | 2/1984 |
| JP | S62-286559 | A | 12/1987 |
| JP | H01-321989 | A | 12/1989 |
| JP | H03-76721 | A | 4/1991 |
| JP | H07-09176 | A | 1/1995 |
| JP | H08-017954 | B2 | 2/1996 |
| JP | H09-067404 | A | 3/1997 |
| JP | 2783048 | B2 | 5/1998 |
| JP | H10-137615 | A | 5/1998 |
| JP | H11-028375 | A | 2/1999 |
| JP | H11-188726 | A | 7/1999 |
| JP | 2000-63527 | A | 2/2000 |
| JP | 2000-143720 | A | 5/2000 |
| JP | 2002-177807 | A | 6/2002 |
| JP | 2002-543243 | A | 12/2002 |
| JP | 2003-82107 | A | 3/2003 |
| JP | 2004-300425 | A | 10/2004 |
| JP | 2007-2067 | A | 1/2007 |
| JP | 2007-071415 | A | 3/2007 |
| JP | 2007-77393 | A | 3/2007 |
| JP | 2008-038128 | A | 2/2008 |
| JP | 2009-52009 | A | 3/2009 |
| JP | 4727005 | B2 | 7/2011 |
| JP | 2012-525454 | A | 10/2012 |
| JP | 2013-507465 | A | 3/2013 |
| JP | 5551836 | B2 | 7/2014 |
| JP | 5619010 | B2 | 11/2014 |
| JP | 2015-221910 | A | 12/2015 |
| JP | 2016-124901 | A | 7/2016 |
| JP | 2017-155194 | A | 9/2017 |
| JP | 2017-197703 | A | 11/2017 |
| JP | 2018-527453 | A | 9/2018 |
| JP | 2018-203997 | A | 12/2018 |
| JP | 2019-052285 | A | 4/2019 |
| JP | 2019-141754 | A | 8/2019 |
| JP | 6650162 | B1 | 2/2020 |
| JP | 6685066 | B1 | 4/2020 |
| JP | 2020-175379 | A | 10/2020 |
| JP | WO 2020/21392 | A1 | 10/2020 |
| JP | 2022-541140 | A | 9/2022 |
| KR | 10-0180956 | B1 | 4/1999 |

(56) References Cited

FOREIGN PATENT DOCUMENTS

| | | | |
|---|---|---|---|
| KR | 20-0252158 | Y1 | 11/2001 |
| KR | 10-2005-0018471 | A | 2/2005 |
| KR | 10-0823419 | B1 | 4/2008 |
| KR | 10-0874695 | B1 | 12/2008 |
| KR | 20-0446736 | Y1 | 3/2009 |
| KR | 10-0904050 | B1 | 6/2009 |
| KR | 10-0913875 | B1 | 8/2009 |
| KR | 10-2009-0094416 | | 9/2009 |
| KR | 10-2011-0003258 | A | 1/2011 |
| KR | 10-2011-0082133 | A | 7/2011 |
| KR | 10-2011-0131131 | A | 12/2011 |
| KR | 10-2011-0137081 | A | 12/2011 |
| KR | 10-2011-0138635 | A | 12/2011 |
| KR | 10-1280582 | B1 | 7/2013 |
| KR | 10-2013-0096218 | A | 8/2013 |
| KR | 10-2015-0016241 | A | 2/2015 |
| KR | 10-2015-0019319 | A | 2/2015 |
| KR | 10-2015-0067729 | A | 6/2015 |
| KR | 10-1546919 | B1 | 8/2015 |
| KR | 10-2015-0141424 | A | 12/2015 |
| KR | 10-2015-0141425 | A | 12/2015 |
| KR | 10-2016-0020864 | A | 2/2016 |
| KR | 10-2016-0078114 | A | 7/2016 |
| KR | 10-1645684 | B1 | 8/2016 |
| KR | 10-2016-0149235 | A | 12/2016 |
| KR | 10-2017-0068276 | | 6/2017 |
| KR | 10-2017-0095268 | A | 8/2017 |
| KR | 10-2018-0127377 | A | 11/2018 |
| KR | 10-2019-0027682 | A | 3/2019 |
| KR | 10-2019-0031483 | A | 3/2019 |
| KR | 10-2019-0069101 | A | 6/2019 |
| KR | 10-2019-0077540 | A | 7/2019 |
| KR | 10-2019-0077541 | A | 7/2019 |
| KR | 10-2015675 | B1 | 8/2019 |
| KR | 10-2020-0007270 | A | 1/2020 |
| KR | 10-2020-0055648 | A | 5/2020 |
| KR | 10-2020-0056050 | A | 5/2020 |
| KR | 10-2020-0068376 | A | 6/2020 |
| KR | 10-2020-0116770 | A | 10/2020 |
| KR | 10-2021-0010504 | A | 1/2021 |
| KR | 10-2021-0013101 | A | 2/2021 |
| KR | 10-2021-0033876 | A | 3/2021 |
| KR | 10-2021-0046570 | A | 4/2021 |
| KR | 10-2021-0062459 | A | 5/2021 |
| KR | 10-2025-0081347 | A | 6/2025 |
| WO | 87/03208 | A1 | 6/1987 |
| WO | 87/06496 | A1 | 11/1987 |
| WO | 91/07228 | A1 | 5/1991 |
| WO | 1996/013542 | A1 | 5/1996 |
| WO | 97/38740 | A1 | 10/1997 |
| WO | 03/104286 | A1 | 12/2003 |
| WO | 2010/040467 | A1 | 4/2010 |
| WO | 2011/024971 | A1 | 3/2011 |
| WO | 2011/078298 | A1 | 6/2011 |
| WO | 2011/157656 | A3 | 12/2011 |
| WO | 2013/161229 | A1 | 10/2013 |
| WO | 2015/030130 | A1 | 3/2015 |
| WO | 2015/163508 | A1 | 10/2015 |
| WO | 2016/105119 | A1 | 6/2016 |
| WO | 2016/204302 | A1 | 12/2016 |
| WO | 2017/115861 | A1 | 7/2017 |
| WO | 2017/169246 | A1 | 10/2017 |
| WO | 2018/092863 | A1 | 5/2018 |
| WO | 2018/092864 | A1 | 5/2018 |
| WO | 2018-147317 | A1 | 8/2018 |
| WO | 2018/174175 | A1 | 9/2018 |
| WO | 2019/111812 | A1 | 6/2019 |
| WO | 2019/181410 | A1 | 9/2019 |
| WO | 2019/221154 | A1 | 11/2019 |
| WO | 2019/221236 | A1 | 11/2019 |
| WO | 2020-067310 | A1 | 4/2020 |
| WO | 2020079152 | A1 | 4/2020 |
| WO | 2020-144948 | A1 | 7/2020 |
| WO | 2020/145384 | A1 | 7/2020 |
| WO | 2020/213192 | A1 | 10/2020 |
| WO | 2020/0216433 | A1 | 10/2020 |
| WO | 2021/054564 | A1 | 3/2021 |
| WO | 2021/075921 | A1 | 4/2021 |
| WO | 2021/101277 | A1 | 5/2021 |
| WO | 2022/265476 | A1 | 12/2022 |
| WO | 2023/149681 | A1 | 8/2023 |

OTHER PUBLICATIONS

Odian, "Principles of Polymerization," Second Edition, A Wiley-Interscience Publication, John Wiley & Sons, Inc., p. 203, (1981).

Schwalm, "UV Coatings Basics, Recent Developments and New Applications," Elsevier, p. 115, (2006).

Extended European Search Report dated Dec. 22, 2023, of the corresponding European Patent Application No. 22825399.3.

Extended European Search Report dated Dec. 15, 2023, of the corresponding European Patent Application No. 22825400.9.

Office Action dated Jan. 28, 2025 issued in related Japanese Patent Application No. 2023-539357.

Office Action dated Jan. 2, 2025 issued in related Chinese Patent Application No. 202280006910.3.

Office Action dated Jan. 13, 2025 issued in related Korean Patent Application No. 10-2022-007462.

Office Action dated Jan. 16, 2025 issued in related U.S. Appl. No. 18/023,648.

Office Action dated Dec. 2, 2025 issued in related Japanese Application No. 2023-572206.

Office Action dated Jun. 4, 2024, of the corresponding Chinese Patent Application No. 202280006910.3.

Extended European Search Report dated Jun. 24, 2024, of the corresponding European Patent Application No. 22825382.9.

Extended European Search Report issued in application 22825391.0 dated Apr. 5, 2024.

Database WPI, 2017, Clarivate Analytics, Thomson Scientific, AN 2007-305627, p. 1-2, XP 002810991.

Zaquen, et al., "Polymer Synthesis in Continuous Flow Reactors," Progress in Polymer Science, vol. 107, p. 1-40, 2020, XP 086212084.

Extended European Search Report issued Feb. 12, 2024 for European Patent Application No. 22825401.7.

Extended European Search Report issued Mar. 5, 2024 for European Patent Application No. 22825389.4.

Conduction Flow Dryer manufactured by Okawara Manufacturing Co., Ltd., retrieved from www.okawara.co.jp/produts/156.

Edana Standard Test method—WSP 270.3 (10) (cited by third party observation filed in KR 2022-008723 dated Oct. 17, 2023).

Edana Standard Test method—WSP 242.3.10, WSP 241.3.10 (cited by third party observation filed in KR 2022-008723 dated Oct. 17, 2023).

Buchholz et al., Modern Superabsorbent Polymer Technology, Wiley-Vch (cited by third party observation filed in KR 2022-008723 dated Oct. 17, 2023).

Office Action dated Sep. 30, 2024 issued in the corresponding Chinese Patent Application No. 202280006016.6.

Office Action dated May 8, 2025, issued in related U.S. Appl. No. 18/031,871.

Notice of Allowance dated Sep. 15, 2025 issued in corresponding U.S. Appl. No. 18/031,871.

Non Final Office Action dated Jan. 8, 2026 issued in the corresponding U.S. Appl. No. 18/023,671.

Office Action issued in U.S. Appl. No. 18/566,082, dated Jun. 9, 2026.

Jack Yuan, "Rotary dryer working principle", 2020, Palet, Bio Pellet Machines, 8 pages.

Office Action issued in corresponding European Application No. 22 825 399.3, dated Jul.20, 2026.

Office Action issued in corresponding U.S. Appl. No. 18/566,080, dated Aug. 25, 2026.

Notice of Allowance issued in corresponding U.S. Appl. No. 18/033,296, dated Aug. 28, 2026.

* cited by examiner

PREPARATION METHOD OF SUPERABSORBENT POLYMER

TECHNICAL FIELD

Cross-reference to Related Application(s)

The present application is based on, and claims priority from, Korean Patent Application Nos. 10-2021-0079644, 10-2021-0080229, and 10-2022-0074633, filed on Jun. 18, 2021, Jun. 21, 2021, and Jun. 20, 2022, respectively, the disclosures of which are hereby incorporated by reference herein in their entirety.

The present invention relates to a method for preparing a superabsorbent polymer. More particularly, the present invention relates to a method for preparing a superabsorbent polymer exhibiting a remarkably reduced generation of fine particles and excellent absorption properties.

BACKGROUND ART

A superabsorbent polymer (SAP) is a synthetic polymeric material capable of absorbing moisture from 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used for water retaining soil products for gardening, water stop materials for the civil engineering and construction, sheets for raising seedling, fresh-keeping agents for food distribution fields, materials for poultice, etc.

In most cases, these superabsorbent polymers have been widely used in the field of sanitary materials such as diapers or sanitary napkins. Inside the sanitary materials, the superabsorbent polymer is generally distributed throughout pulp. However, recent efforts have been continuously made to provide sanitary materials such as diapers having a thinner thickness, etc., and as part of that, diapers having a reduced content of pulp, and furthermore, diapers having no pulp, so-called pulpless diapers are actively under development.

As described above, such a sanitary material having a reduced content of pulp or having no pulp includes the superabsorbent polymer at a relatively high ratio, and the superabsorbent polymer particles are inevitably included as multiple layers in the sanitary materials. In order to allow the whole superabsorbent polymer particles included as multiple layers to more efficiently absorb a large amount of liquid such as urine, etc., it is necessary that the superabsorbent polymer basically exhibits high absorption performance and high absorption rate.

On the other hand, such a superabsorbent polymer is generally prepared by the step of polymerizing an acrylic acid-based monomer to prepare a water-containing gel polymer containing a large amount of water, the step of drying the water-containing gel polymer, and the step of pulverizing the water-containing gel polymer into polymer particles having a desired particle size. Further, to facilitate the drying of the water-containing gel polymer and to increase the efficiency of the subsequent pulverization process, a process of pulverizing the water-containing gel polymer into particles having a size of several hundred micrometers to several thousand micrometers is performed before the drying process.

A chopper is mainly used to pulverize the water-containing gel. However, the water-containing gel polymer is a particle having elasticity, and therefore, as the particle size is smaller, it is more difficult to chop or pulverize the water-containing gel polymer using the chopper. In addition, due to adhesiveness of the water-containing gel polymer, the water-containing gel polymers chopped or pulverized by the chopper easily agglomerate to each other. When they are dried in this agglomerated form, many fine particles are generated in the subsequent pulverization process, which cause a problem of deteriorating physical properties of the superabsorbent polymer finally prepared.

Accordingly, to fundamentally solve the above problem, there is a continuous demand for the development of a technology capable of preparing a superabsorbent polymer without generating fine particles.

DETAILED DESCRIPTION OF THE INVENTION

Technical Problem

Accordingly, there is provided a method for preparing a superabsorbent polymer, wherein a water-containing gel having a smaller size is prepared during a water-containing gel pulverization process, thereby minimizing the pulverization process after drying, remarkably reducing generation of fine particles, and improving absorption properties of the prepared superabsorbent polymer.

Technical Solution

To achieve the above object, there is provided a method for preparing a superabsorbent polymer, the method including the steps of:

forming a water-containing gel polymer, in which a water-soluble ethylenically unsaturated monomer having acidic groups and an internal crosslinking agent are crosslinking-polymerized;

preparing a primary pulverized water-containing gel polymer by performing a primary water-containing gel pulverization of the water-containing gel polymer in the presence of a surfactant;

preparing a primary dry water-containing gel polymer by performing a primary moving type drying of the primary pulverized water-containing gel polymer;

preparing a secondary pulverized water-containing gel polymer by performing a secondary water-containing gel pulverization of the primary dry water-containing gel polymer;

preparing a secondary dry water-containing gel polymer by performing a secondary moving type drying of the secondary pulverized water-containing gel polymer; and preparing superabsorbent polymer particles by pulverizing the secondary dry water-containing gel polymer, wherein the primary drying is performed such that a ratio of a water content of the primary dry water-containing gel polymer to a water content of the water-containing gel polymer is 45% to 80%.

There is also provided a superabsorbent polymer which is prepared by the method for preparing the superabsorbent polymer.

Advantageous Effects

According to a method for preparing a superabsorbent polymer of the present invention, it is possible to reduce generation of fine particles during the preparation process and to provide a superabsorbent polymer exhibiting excellent absorption properties.

Therefore, the superabsorbent polymer prepared by the preparation method may be appropriately used for sanitary materials such as diapers, particularly, ultra-thin sanitary materials having a reduced content of pulp, etc.

DETAILED DESCRIPTION OF THE EMBODIMENTS

The terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components, or combinations thereof beforehand.

The present invention may be variously modified and have various forms, and specific exemplary embodiments are exemplified and explained in detail in the following description. However, it is not intended to limit the present invention to the specific exemplary embodiments and it must be understood that the present invention includes every modifications, equivalents, or replacements included in the spirit and technical scope of the present invention.

Hereinafter, a method for preparing a superabsorbent polymer according to the present invention and a superabsorbent polymer prepared thereby will be described in more detail.

In advance, the technical terms used in this description are just for explaining exemplary embodiments and it is not intended to restrict the present invention. The singular expression used herein may include the plural expression unless it is differently expressed contextually.

The method for preparing a superabsorbent polymer according to the present invention may include the steps of:

- forming a water-containing gel polymer, in which a water-soluble ethylenically unsaturated monomer having acidic groups and an internal crosslinking agent are crosslinking-polymerized (step 1);
- preparing a primary pulverized water-containing gel polymer by performing a primary water-containing gel pulverization of the water-containing gel polymer in the presence of a surfactant (step 2);
- preparing a primary dry water-containing gel polymer by performing a primary moving type drying of the primary pulverized water-containing gel polymer (step 3);
- preparing a secondary pulverized water-containing gel polymer by performing a secondary water-containing gel pulverization of the primary dry water-containing gel polymer (step 4);
- preparing a secondary dry water-containing gel polymer by performing a secondary moving type drying of the secondary pulverized water-containing gel polymer (step 5); and
- preparing superabsorbent polymer particles by pulverizing the secondary dry water-containing gel polymer (step 6),
- wherein the primary drying is performed such that a ratio of a water content of the primary dry water-containing gel polymer to a water content of the water-containing gel polymer is 45% to 80%.

As used herein, the term "polymer" refers to a polymerized state of water-soluble ethylenically unsaturated monomers, and may encompass those of all water content ranges or particle diameter (or particle size) ranges.

Further, as used herein, the term "superabsorbent polymer" refers to, depending on the context, a crosslinked polymer or a base polymer or water-containing gel polymer in the form of powder consisting of superabsorbent polymer particles obtained by pulverizing the crosslinked polymer, or is used to encompass those made suitable for commercialization by an additional process of the crosslinked polymer or the base polymer, for example, drying, pulverizing, classifying, surface crosslinking, etc.

Further, as used herein, the term "normal particle" refers to a particle having a particle diameter (or particle size) of 150 μm to 850 μm among superabsorbent polymer particles, and the term "fine particle" refers to a particle having a particle diameter of less than 150 μm among superabsorbent polymer particles. In addition, the term "coarse particle" refers to a particle having a particle diameter of 1400 μm or more among superabsorbent polymer particles. These particle diameters of the superabsorbent polymer particles may be measured according to the European Disposables and Nonwovens Association (EDANA) standard WSP 220.3 method.

As used herein, the term "water-containing gel pulverization" refers to pulverizing the water-containing gel polymer to a particle size of the micrometer level in order to increase the efficiency of drying, and is distinguished from "chopping", whereby the water-containing gel polymer is fragmented to small pieces of millimeter sizes.

In addition, the term "micronizing (micronization)" refers to pulverizing the water-containing gel polymer to a particle size of tens to hundreds of micrometers, and is distinguished from "chopping".

A traditional superabsorbent polymer is prepared by forming a water-containing gel polymer by crosslinking polymerization of water-soluble ethylenically unsaturated monomer having at least partially neutralized acidic groups in the presence of an internal crosslinking agent and a polymerization initiator, drying the water-containing gel polymer thus formed, and then micronizing the water-containing gel polymer by pulverizing at a desired particle size. In addition, in order to facilitate drying during the drying process of the water-containing gel polymer and to increase the efficiency of the subsequent pulverizing process, a water-containing gel pulverization process is performed, in which the water-containing gel polymer is chopped or pulverized into millimeter-level particles using a chopper before the drying process of the water-containing gel polymer.

However, since the water-containing gel polymer has elasticity, there are problems in that it is not easy to chop or pulverize the water-containing gel polymer by the chopper, and the water-containing gel polymer larger than the size of the hole provided in a perforated sheet of the chopper passes through the hole. In addition, due to adhesiveness of the water-containing gel polymer, the chopped or pulverized water-containing gel polymers agglomerate to each other to form agglomerates with a size of about 1 cm to 10 cm. This gel-type agglomerated water-containing gel polymer is laminated on a belt made of the perforated sheet, and dried in a sheet form by hot air supplied from the lower or upper part. The polymer dried by the drying method exhibits a sheet shape rather than a particle shape, and therefore, to pulverize the polymer into micro-sized particles, a multi-stage pulverization process must be performed, and as a result, a large amount of fine particles are generated. Specifically, the amount of fine particles separated in the final classifying step by the preparation method is about 10% by weight to about 20% by weight, based on the total weight of the superabsorbent polymer finally prepared. As described, since a large amount of fine particles is generated, the separated fine particles are reassembled by mixing with an appropriate amount of water, and then injected in the water-containing gel pulverization step or before the drying step for recycling.

However, when the fine particle re-assembly mixed with water is re-injected to the pulverization or drying process for recycling of the fine particles, it may cause a problem such as an increase in the device load or an increase in energy consumption. In addition, physical properties of the superabsorbent polymer are deteriorated by the fine particles left unclassified.

Accordingly, the present inventors have identified that the amount of fine particles generated in the traditional preparation method is greatly influenced by the size of particles injected into the pulverization process, and they have found that the pulverization may be facilitated by controlling the water content of the water-containing gel polymer, and at the same time, the size of particles injected into the subsequent pulverization process may be reduced by controlling agglomeration between the pulverized water-containing gel polymers and by uniformly drying the pulverized water-containing gel polymer through moving type drying, thereby minimizing frequency of the pulverization process and reducing the content of coarse particles in the pulverized water-containing gel polymer, and as a result, the amount of fine particles generated during the process of preparing the superabsorbent polymer may be significantly reduced.

Further, the superabsorbent polymer which is prepared by the preparation method of the present invention may have a uniform particle size and a narrow particle size distribution, and a low content of water-soluble components, thereby exhibiting improved rewetting property and absorption rate, together with excellent absorption properties such as water retention capacity and absorbency under pressure.

Hereinafter, each step of the method for preparing a superabsorbent polymer according to one embodiment will be described in more detail.

Step 1

The step 1 is a step of forming a water-containing gel polymer, in which a water-soluble ethylenically unsaturated monomer having acidic groups and an internal crosslinking agent are crosslinking-polymerized.

Specifically, the water-containing gel polymer may be prepared by a method including the step of neutralizing at least part of the acidic groups of the water-soluble ethylenically unsaturated monomer, and the step of forming the water-containing gel polymer by performing polymerization of a monomer composition which is prepared by mixing the water-soluble ethylenically unsaturated monomer having at least partially neutralized acidic groups with an internal crosslinking agent and a polymerization initiator (Method 1), or a method including the step of forming a polymer, in which the water-soluble ethylenically unsaturated monomer having acidic groups and the internal crosslinking agent are crosslinking-polymerized, by performing polymerization of the monomer composition including the water-soluble ethylenically unsaturated monomer having acidic groups, the internal crosslinking agent, and the polymerization initiator, and the step of forming the water-containing gel polymer by neutralizing at least part of the acidic groups of the polymer (Method 2).

In Method 1, before polymerization of the water-soluble ethylenically unsaturated monomer, at least part of the acidic groups in the monomer is neutralized, and then polymerization is performed. The polymer prepared by Method 1 has a water retention property to absorb surrounding water, and thus it may be generally prepared in the form of a water-containing gel polymer having a high water content of 30% by weight or more.

In contrast, in Method 2, before neutralizing the acidic groups of the water-soluble ethylenically unsaturated monomer, polymerization is first performed to form the polymer, and then the acidic groups present in the polymer is neutralized. The polymer formed after polymerization exhibits a low water retention property, and as a result, the polymer exists as a solid state with little water absorption in the monomer composition. However, it has a water retention property by the subsequent neutralization process, and becomes the water-containing gel polymer.

Further, in Method 2, the water-soluble ethylenically unsaturated monomer, of which acidic groups are not neutralized, (e.g., acrylic acid) is in a liquid state at room temperature, and its solubility or miscibility in a solvent (water) is high, and thus it does not precipitate even at a low temperature. Accordingly, it is advantageous for a long-time polymerization at a low temperature, and a polymer having a high molecular weight and a uniform molecular weight distribution may be stably formed.

Further, water-soluble components, which are usually generated during the preparation of polymers, are easily eluted when the superabsorbent polymer comes into contact with a liquid. Therefore, when the content of the water-soluble components is high, most of the eluted water-soluble components remains on the surface of the superabsorbent polymer, making the superabsorbent polymer sticky, which causes a decrease in liquid permeability. Therefore, it is important to maintain the low content of the water-soluble components in terms of liquid permeability. As in Method 2, when polymerization is first performed in an unneutralized state, a longer-chain polymer may be formed, and the content of the water-soluble components present in an uncrosslinked state due to incomplete polymerization or crosslinking may be reduced, and as a result, the liquid permeability of the superabsorbent polymer may be improved.

Also, as in Method 2, when polymerization is first performed to form the polymer before neutralizing the acidic groups of the acrylic monomer, and micronization is performed in the presence of a surfactant after neutralization, or micronization is performed in the presence of the surfactant, followed by neutralization, or micronization and neutralization of the acidic groups present in the polymer are performed at the same time, a large amount of the surfactant is present on the surface of the polymer to lower adhesiveness of the polymer, thereby preventing agglomeration between the polymer particles. As a result, it is possible to pulverize the polymer to the size level of normal particles during the micronization process, and since the drying process is performed after pulverizing to the size level of normal particles, the amount of fine particles generated during the process may be significantly reduced.

Accordingly, it is preferable that the method for preparing the water-containing gel polymer is appropriately selected from Method 1 and Method 2 by considering the subsequent process and conditions.

Specifically, Method 1 includes the step of neutralizing at least part of the acidic groups of the water-soluble ethylenically unsaturated monomer, and the step of forming the water-containing gel polymer by performing polymerization of the monomer composition including the water-soluble ethylenically unsaturated monomer having at least partially neutralized acidic groups, the internal crosslinking agent, and the polymerization initiator.

The water-soluble ethylenically unsaturated monomer may be any monomer commonly used in the preparation of the superabsorbent polymer. For non-limiting example, the water-soluble ethylenically unsaturated monomer may be a compound represented by the following Formula 1:

R—COOM' (1)

in Formula 1,

R is an alkyl group having 2 to 5 carbon atoms including an unsaturated bond, and M' is a hydrogen atom, a monovalent or divalent metal, an ammonium group, or an organic amine salt.

Preferably, the monomer may be one or more selected from the group consisting of (meth)acrylic acid, and a monovalent (alkali) metal salt, a divalent metal salt, an ammonium salt, and an organic amine salt thereof.

When (meth)acrylic acid and/or a salt thereof is used as the water-soluble ethylenically unsaturated monomer, it is advantageous in that a superabsorbent polymer having improved absorption property may be obtained. In addition, as the monomer, maleic anhydride, fumaric acid, crotonic acid, itaconic acid, 2-acryloylethanesulfonic acid, 2-methacryloylethanesulfonic acid, 2-(meth)acryloylpropane sulfonic acid, or 2-(meth)acrylamido-2-methylpropane sulfonic acid, (meth)acrylamide, N-substituted (meth)acrylate, 2-hydroxyethyl(meth)acrylate, 2-hydroxypropyl(meth)acrylate, methoxypolyethylene glycol(meth)acrylate, polyethylene glycol (meth)acrylate, (N,N)-dimethylaminoethyl(meth) acrylate, (N,N)-dimethylaminopropyl(meth)acrylamide, etc. may be used.

The water-soluble ethylenically unsaturated monomer has acidic groups, of which at least part may be neutralized by a neutralizing agent.

With regard to the preparation method according to the present invention, in Method 1, neutralization of at least part of the acidic groups of the water-soluble ethylenically unsaturated monomer may be performed during the process of preparing the monomer composition by mixing the water-soluble ethylenically unsaturated monomer having acidic groups, the internal crosslinking agent, the polymerization initiator, and the neutralizing agent. The monomer composition thus prepared includes the water-soluble ethylenically unsaturated monomer having at least partially neutralized acidic groups, the internal crosslinking agent, and the polymerization initiator.

During the neutralization, the concentration of the water-soluble ethylenically unsaturated monomer having acidic groups may be appropriately determined in consideration of the polymerization time, the reaction conditions, etc. in the subsequent polymerization reaction step. For example, in the present invention, the concentration of the water-soluble ethylenically unsaturated monomer in the mixture including the water-soluble ethylenically unsaturated monomer having acidic groups, the internal crosslinking agent, the polymerization initiator, and the neutralizing agent may be 20% by weight to 60% by weight, specifically, 20% by weight or more, and 60% by weight or less, or 40% by weight or less.

In addition, as the neutralizing agent, one or more basic substances capable of neutralizing acidic groups, such as sodium hydroxide, potassium hydroxide, ammonium hydroxide, etc., may be used.

The degree of neutralization of the acidic groups included in the water-soluble ethylenically unsaturated monomer by the neutralizing agent is called the degree of neutralization of the water-soluble ethylenically unsaturated monomer. An excessively high degree of neutralization causes the neutralized monomers to be precipitated, and thus polymerization may not readily occur, whereas an excessively low degree of neutralization not only greatly deteriorates the absorbency of the polymer, but also endows the polymer with hard-to-handle properties, such as those of an elastic rubber. Therefore, it is preferable that the degree of neutralization of the water-soluble ethylenically unsaturated monomers may be appropriately determined according to physical properties of the superabsorbent polymer to be achieved. For example, in the present invention, the degree of neutralization of the water-soluble ethylenically unsaturated monomers may be 50 mol % to 90 mol %, more specifically, 50 mol % or more, or 60 mol % or more, or 65 mol % or more, and 90 mol % or less, or 85 mol % or less, or 80 mol % or less, or 75 mol % or less.

Meanwhile, as used herein, the term 'internal crosslinking agent' is a term used to distinguish it from a surface crosslinking agent for crosslinking the surface of the superabsorbent polymer particles, described below. In the present invention, the internal crosslinking agent serves to form a polymer including a cross-linked structure by introducing a cross-linkage between unsaturated bonds of the above-described water-soluble ethylenically unsaturated monomers.

The crosslinking occurs regardless of the surface or inside of the polymer. However, when the surface crosslinking process of the superabsorbent polymer particles described below is performed, the surface of the superabsorbent polymer particles finally prepared may include a structure newly crosslinked by the surface crosslinking agent, and the inside of the superabsorbent polymer particles may intactly maintain a structure crosslinked by the internal crosslinking agent.

As the internal crosslinking agent, one or more of multifunctional acrylate-based compounds, multifunctional allyl-based compounds, and multifunctional vinyl-based compounds may be used.

The multifunctional acrylate-based compounds may specifically include ethylene glycol di(meth)acrylate, diethylene glycol di(meth)acrylate, triethylene glycol di(meth) acrylate, tetraethylene glycol di(meth)acrylate, polyethylene glycol diacrylate, polyethylene glycol di(meth)acrylate, propylene glycol di(meth)acrylate, tripropylene glycol di(meth) acrylate, polypropylene glycol di(meth)acrylate, butanediol di(meth)acrylate, butylene glycol di(meth)acrylate, hexanediol di(meth)acrylate, pentaerythritol di(meth)acrylate, pentaerythritol tri(meth)acrylate, pentaerythritol tetra(meth) acrylate, dipentaerythritol di(meth)acrylate, dipentaerythritol tri(meth)acrylate, dipentaerythritol tetra (meth)acrylate, dipentaerythritol penta(meth)acrylate, trimethylolpropane di(meth)acrylate, trimethylolpropane tri (meth)acrylate, glycerin di(meth)acrylate, glycerin tri(meth) acrylate, etc., and any one thereof or a mixture of two or more thereof may be used.

Further, the multifunctional allyl-based compounds may specifically include ethylene glycol diallyl ether, diethylene glycol diallyl ether, triethylene glycol diallyl ether, tetraethylene glycol diallyl ether, polyethylene glycol diallyl ether, propylene glycol diallyl ether, tripropylene glycol diallyl ether, polypropylene glycol diallyl ether, butanediol diallyl ether, butylene glycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, glycerin triallyl ether, etc., and any one thereof or a mixture of two or more thereof may be used.

Further, the multifunctional vinyl-based compounds may specifically include ethylene glycol divinyl ether, diethylene glycol divinyl ether, triethylene glycol divinyl ether, tetraethylene glycol divinyl ether, polyethylene glycol divinyl ether, propylene glycol divinyl ether, tripropylene glycol divinyl ether, polypropylene glycol divinyl ether, butanediol divinyl ether, butylene glycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentavinyl ether, trimethylolpropane divinyl ether, trimethylolpropane trivinyl ether, glycerin divinyl ether, glycerin trivinyl ether, etc., and any one thereof or a mixture of two or more thereof may be used.

In the multifunctional allyl-based compounds and the multifunctional vinyl-based compounds, two or more unsaturated groups included in the molecule bind with unsaturated bonds of the water-soluble ethylenically unsaturated monomers or unsaturated bonds of other internal crosslinking agents, respectively, thereby forming a crosslinked structure during the polymerization process and stably maintaining the crosslinking even during the neutralization process after the above-described polymerization reaction, unlike acrylate-based compounds including ester bonds (—(C═O)O—) in the molecule. Accordingly, a gel strength of the superabsorbent polymer to be prepared may be increased, process stability may be increased during a discharging process after polymerization, and the amount of water-soluble components may be minimized.

The internal crosslinking agent may be used in an amount of 0.01 part by weight to 5 parts by weight with respect to 100 parts by weight of the water-soluble ethylenically unsaturated monomer. For example, the internal crosslinking agent may be used in an amount of 0.01 part by weight or more, or 0.05 parts by weight or more, or 0.1 part by weight or more, and 5 parts by weight or less, or 3 parts by weight or less, or 2 parts by weight or less, or 1 part by weight or less, or 0.7 parts by weight or less with respect to 100 parts by weight of the water-soluble ethylenically unsaturated monomer. When the content of the internal crosslinking agent is too low, crosslinking does not occur sufficiently, and thus it may be difficult to achieve the strength above the appropriate level, and when the content of the internal crosslinking agent is too high, it may be difficult to achieve the desired water retention capacity due to the increased internal crosslinking density.

The polymer formed using the internal crosslinking agent has a three-dimensional network structure in which main chains formed by polymerization of the water-soluble ethylenically unsaturated monomers are crosslinked by the internal crosslinking agent. As described, when the polymer has the three-dimensional network structure, water retention capacity and absorbency under pressure, which are general physical properties of the superabsorbent polymer, may be remarkably improved, as compared to a two-dimensional linear structure, in which additional crosslinking by the internal crosslinking agent does not occur.

Further, during preparation of the monomer composition, it preferable that the polymerization initiator is appropriately selected according to the polymerization method.

When a thermal polymerization method is employed during formation of the water-containing gel polymer, a thermal polymerization initiator is used. When a photo-polymerization method is employed, a photo-polymerization initiator is used. When a hybrid polymerization method (a method of using both heat and light) is employed, both the thermal polymerization initiator and the photo-polymerization initiator may be used. However, even in the case of the photo-polymerization method, a certain amount of heat is generated by light irradiation such as ultraviolet irradiation, etc., and a certain amount of heat is generated according to the progression of the polymerization reaction, which is an exothermic reaction, and therefore, the thermal polymerization initiator may be additionally used.

The photo-polymerization initiator may be used without limitation in view of constitution as long as it is a compound capable of forming a radical by light such as ultraviolet rays.

The photo-polymerization initiator may include, for example, one or more selected from the group consisting of benzoin ether, dialkyl acetophenone, hydroxyl alkylketone, phenyl glyoxylate, benzyl dimethyl ketal, acyl phosphine, and α-aminoketone. Further, specific examples of the acyl phosphine may include diphenyl(2,4,6-trimethylbenzoyl) phosphine oxide, phenylbis(2,4,6-trimethylbenzoyl)phosphine oxide, ethyl(2,4,6-trimethylbenzoyl)phenylphosphinate, etc. More various photo-polymerization initiators are well disclosed in "UV Coatings: Basics, Recent Developments and New Application (Elsevier, 2007)" written by Reinhold Schwalm, p 115, however, the photo-polymerization initiator is not limited to the above-described examples.

Further, as the thermal polymerization initiator, one or more selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate ($(NH_4)_2S_2O_8$), etc., and examples of the azo-based initiator may include 2,2-azobis-(2-amidinopropane)dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, 4,4-azobis-(4-cyanovaleric acid), etc. More various thermal polymerization initiators are well disclosed in 'Principle of Polymerization (Wiley, 1981)' written by Odian, p 203, however, the thermal polymerization initiator is not limited to the above-described examples.

The polymerization initiator may be used in an amount of 2 parts by weight or less with respect to 100 parts by weight of the water-soluble ethylenically unsaturated monomer. In other words, when the concentration of the polymerization initiator is too low, the polymerization rate may become slow, and a large amount of residual monomer may be extracted in the final product, which is not preferred. On the contrary, when the concentration of the polymerization initiator is higher than the above range, polymer chains constituting the network become short, and thus the content of water-soluble components is increased and physical properties of the polymer may deteriorate, such as a reduction in absorbency under pressure, which is not preferred.

In addition, when preparing the monomer composition, a reducing agent forming a redox couple with the polymerization initiator may be further introduced.

Specifically, when the polymerization initiator and the reducing agent are added to the polymer solution, they react with each other to form radicals. The formed radicals react with the monomer. Since the oxidation-reduction reaction between the polymerization initiator and the reducing agent is highly reactive, the polymerization starts even though only small amounts of the polymerization initiator and the reducing agent are added, and thus there is no need to increase the process temperature. Accordingly, a low-temperature polymerization is possible, and changes in the physical properties of the polymer solution may be minimized.

The polymerization reaction using the oxidation-reduction reaction may smoothly occur even at a temperature near or below room temperature (25° C.). For example, the polymerization reaction may be carried out at a temperature of 5° C. or higher and 25° C. or lower, or 5° C. or higher and 20° C. or lower.

When a persulfate-based polymerization initiator is used as the polymerization initiator, one or more selected from the group consisting of sodium metabisulfite ($Na_2S_2O_5$); tetramethyl ethylenediamine (TMEDA); iron(II) sulfate ($FeSO_4$); a mixture of iron(II) sulfate and EDTA ($FeSO_4$/EDTA); sodium formaldehyde sulfoxylate; and disodium 2-hydroxy-2-sulfinoacetate may be used as the reducing agent.

Further, potassium persulfate is used as the polymerization initiator, and disodium 2-hydroxy-2-sulfinoacetate is used as the reducing agent; or ammonium persulfate is used as the polymerization initiator and tetramethylethylenediamine is used as the reducing agent; or sodium persulfate may be used as the polymerization initiator, and sodium formaldehyde sulfoxylate may be used as the reducing agent.

When a peroxide-based initiator is used as the polymerization initiator, one or more selected from the group consisting of ascorbic acid; sucrose; sodium sulfite ($Na_2SO_3$), sodium metabisulfite ($Na_2S_2O_5$); tetramethyl ethylenediamine (TMEDA); a mixture of iron(II) sulfate and EDTA ($FeSO_4$/EDTA); sodium formaldehyde sulfoxylate; disodium 2-hydroxy-2-sulfinoacteate; and disodium 2-hydroxy-2-sulfoacteate may be used as the reducing agent.

Further, during the preparation of the monomer composition, an additive such as a thickener, a plasticizer, a preservation stabilizer, an antioxidant, etc., may be further introduced, as needed.

In the present invention, the monomer composition may be, for example, in a solution state, in which it is dissolved in a solvent such as water. The solid content of the monomer composition in the solution state, that is, the concentration of the monomer, the internal crosslinking agent, and the polymerization initiator, may be appropriately controlled in consideration of the polymerization time, the reaction conditions, etc. For example, the solid content in the monomer composition may be 10% by weight to 80% by weight, or 15% by weight to 60% by weight, or 30% by weight to 50% by weight. When the monomer composition has the solid content in the above range, it may be advantageous in controlling the pulverization efficiency during pulverization of the polymer to be described later while there is no need to remove unreacted monomers after polymerization by using a gel effect phenomenon that occurs in the polymerization reaction of an aqueous solution at a high concentration.

As the solvent to be applicable, any solvent may be used without limitations in view of constitution as long as it is able to dissolve the above components. For example, water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide, or a mixture thereof may be used as the solvent.

Next, the polymerization process of the monomer composition may be performed without particular limitations in view of constitution as long as it is able to form the water-containing gel polymer by thermal polymerization, photo-polymerization, or hybrid polymerization.

Specifically, the polymerization method is largely classified into thermal polymerization and photo-polymerization according to a polymerization energy source. When the thermal polymerization is carried out, it may be commonly carried out in a reactor like a kneader equipped with agitating spindles. When the photo-polymerization is carried out, it may be carried out in a reactor equipped with a movable conveyor belt or in a flat-bottomed vessel.

In the polymerization method as described above, a polymer of which molecular weight is not large and molecular weight distribution is wide may be generally formed according to a short polymerization reaction time (e.g., 1 hour or shorter).

For example, the water-containing gel polymer which is obtained by performing thermal polymerization by providing hot air into the reactor like a kneader equipped with the agitating spindles as described above, or by heating the reactor is discharged at a size of centimeters or millimeters from the outlet of the reactor according to the type of agitating spindles equipped in the reactor. Specifically, the water-containing gel polymer may be obtained in various forms according to the concentration of the monomer composition fed thereto, the feeding speed, etc., and the water-containing gel polymer having a weight average particle diameter of 2 mm to 50 mm may be generally obtained.

Further, as described above, when the photo-polymerization is carried out in a reactor equipped with a movable conveyor belt or in a flat-bottomed vessel, the obtained water-containing gel polymer may be usually a sheet-like water-containing gel polymer having a width of the belt. In this case, the thickness of the polymer sheet may vary depending on the concentration of the monomer composition fed thereto and the feeding speed or feeding amount, and usually, it is preferable to supply the monomer composition such that a sheet-like polymer having a thickness of about 0.5 cm to about 5 cm may be obtained. When the monomer composition is supplied to such an extent that the thickness of the sheet-like polymer becomes too thin, it is undesirable because the production efficiency is low, and when the thickness of the sheet-like polymer is more than 5 cm, the polymerization reaction may not evenly occur over the entire thickness because of the excessive thick thickness.

In addition, in the traditional polymerization in a reactor having agitating spindles, equipped with a conveyor belt, a new monomer composition is supplied to the reactor while the polymerization product moves, and thus polymerization continuously occurs, and polymers having different polymerization rates are mixed. Accordingly, uniform polymerization hardly occurs throughout the monomer composition, and overall physical properties may deteriorate.

For this reason, in the preparation method of the present invention, the polymerization reaction of the monomer composition may be performed in a batch-type reactor.

As described above, as the polymerization is performed in a fixed-bed type in the batch-type reactor, there is little risk of mixing of polymers with different polymerization rates, and as a result, a polymer having uniform quality may be obtained.

In addition, when the polymerization is performed in the batch-type reactor, it may be performed for a longer period of time, for example, 3 hours or longer than polymerization continuously performed in the reactor equipped with the conveyor belt. However, despite the long polymerization time as described above, since the polymerization is performed for the water-soluble ethylenically unsaturated monomer in an unneutralized state, the monomer is not easily precipitated even after the long-time polymerization, and thus it is advantageous for the long-time polymerization.

Meanwhile, in the polymerization in the batch-type reactor, a thermal polymerization method may be employed, and thus a thermal polymerization initiator is used as the polymerization initiator. The thermal polymerization initiator is the same as described above.

In contrast, Method 2 of preparing the water-containing gel polymer may be performed by the step of forming the polymer, in which the water-soluble ethylenically unsaturated monomer having acidic groups and the internal crosslinking agent are crosslinking-polymerized, by performing polymerization of the monomer composition including the water-soluble ethylenically unsaturated monomer having acidic groups, internal crosslinking agent, and polymerization initiator, and the step of forming the water-containing gel polymer by neutralizing at least part of the acidic groups of the polymer.

In Method 2, the preparation of the monomer composition and the polymerization process thereof may be performed in the same manner as in Method 1, except that a water-soluble ethylenically unsaturated monomer, of which acidic groups are not neutralized, is used during the preparation of the monomer composition.

In addition, the polymerization reaction in Method 2 may be specifically performed in the batch-type reactor. In addition, since the polymerization in the batch-type reactor employs the thermal polymerization method, a thermal polymerization initiator may be used as the polymerization initiator. In addition, as described above, the polymerization may be initiated by adding a reducing agent together with the initiator.

Next, in Method 2, the step of forming the water-containing gel polymer by neutralizing at least part of the acidic groups of the crosslinked polymer may be performed by adding a neutralizing agent to the crosslinked polymer and reacting them with each other.

As in Method 1, basic substances capable of neutralizing acidic groups, such as sodium hydroxide, potassium hydroxide, ammonium hydroxide, etc., may be used as the neutralizing agent.

Further, when the degree of neutralization of the polymer indicating the degree of neutralization of the acidic groups included in the polymer by the neutralizing agent is too high, the concentration of carboxyl groups on the particle surface is too low, making it difficult to perform proper surface crosslinking in the subsequent process, and as a result, absorbency under pressure and liquid permeability may be reduced. On the contrary, an excessively low degree of neutralization of the polymer not only greatly deteriorates the absorbency of the polymer, but also endows the polymer with hard-to-handle properties, such as those of an elastic rubber. Therefore, it is preferable that the degree of neutralization of the polymer is appropriately selected according to physical properties of the superabsorbent polymer to be achieved. For example, in the present invention, the degree of neutralization of the polymer may be 50 mol % to mol %, more specifically, 50 mol % or more, or 60 mol % or more, or 65 mol % or more, and 90 mol % or less, or 85 mol % or less, or 80 mol % or less, or 75 mol % or less.

The polymer prepared according to Method 1 or Method 2 may be in a water-containing gel state, and may have a water content of 30% by weight to 80% by weight, more specifically, 30% by weight or more, or 35% by weight or more, or 40% by weight or more, and 80% by weight or less, or 75% by weight or less, or 70% by weight or less.

When the water content of the water-containing gel polymer is too low, the water-containing gel polymer may not be effectively pulverized because it is difficult to secure an appropriate surface area in the subsequent pulverization step. When the water content of the water-containing gel polymer is too high, it is difficult to pulverize the water-containing gel polymer to the desired particle size, because the pressure applied in the subsequent pulverization step increases. However, the water-containing gel polymer prepared by the preparation method according to the present invention has a water content satisfying the above-mentioned range, and is suitable for the subsequent micronization process.

Meanwhile, as used herein, the "water content" means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer in a crumb state through infrared heating. At this time, the drying conditions may be determined as follows: the drying temperature is increased from room temperature to about 180° C. and then the temperature is maintained at 180° C., and the total drying time is set to 40 minutes, including 5 minutes for the temperature rising step. Detailed measurement method and conditions are the same as in Experimental Example below.

Step 2

Next, the step 2 is a step of performing a primary water-containing gel pulverization of the water-containing gel polymer prepared in the step 1 in the presence of a surfactant.

Specifically, the step 2 is a step of performing shredding of the water-containing gel polymer to a size of several ten micrometers to several hundred micrometers and agglomeration thereof at the same time, rather than chopping the water-containing gel polymer to a size of millimeters. In other words, the step 2 is a step of preparing secondary agglomerated particles, in which a plurality of primary particles shredded to a size of several ten micrometers to several hundred micrometers are agglomerated, by providing appropriate adhesiveness for the water-containing gel polymer.

Traditionally, particles of several mm or several cm in size have been formed by a process of chopping the water-containing gel polymer. Although the surface area of the water-containing gel polymer may be rather increased by this chopping process, it was difficult to expect an effect enough to effectively improve the absorption rate. Accordingly, in order to improve the absorption rate, a method of increasing the surface area by kneading with an increased mechanical force in the chopping step has been proposed. In this case, excessive agglomeration occurred due to the unique stickiness of the polymer, and after chopping, drying and pulverization, amorphous single particles with uneven surface only were formed, and the water-soluble components were rather increased by excessive kneading or crushing.

Accordingly, in the present invention, since the pulverization process for the water-containing gel polymer is performed in the presence of a surfactant, the surfactant is present in a large amount on the surface of the water-containing gel polymer. The surfactant present on the surface of the water-containing gel polymer lowers high adhesiveness of the polymer, thereby preventing excessive agglomeration of the polymer and controlling the agglomeration state at a desired level. As a result, unlike the traditional chopping process performed in a micrometer size, the water-containing gel polymer may be pulverized to a size of several millimeters to several hundred micrometers, and the subsequent pulverization and drying processes may be performed under milder conditions. Therefore, it is possible to remarkably reduce the amount of fine particles generated during the preparation process.

On the other hand, when the water-containing gel polymer is micronized in the presence of the surfactant, there is a possibility that the surfactant may not sufficiently perform its role because the surfactant penetrates into the interior of the water-containing gel polymer rather than exists at the interface of the water-containing gel polymer due to the high water content of the water-containing gel polymer. In contrast, the present invention solves this problem by using a micronizer having a characteristic structure as described above.

In addition, the hydrophobic functional moiety included in the surfactant provides hydrophobicity for the surface of the pulverized superabsorbent polymer particles to relieve friction between particles, thereby increasing the apparent density of the superabsorbent polymer, and the hydrophilic functional moiety included in the surfactant is also bound to the superabsorbent polymer particles to prevent reduction of the surface tension of the superabsorbent polymer. As a result, the superabsorbent polymer prepared by the preparation method according to the present invention may exhibit a high apparent density while exhibiting the surface tension equivalent to that of the superabsorbent polymer without the surfactant.

Specifically, the surfactant may be a compound represented by the following Formula 2 or a salt thereof, but the present invention is not limited thereto:

[Formula 2]

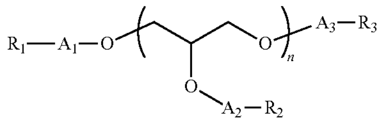

in Formula 2, $A_1$, $A_2$ and $A_3$ are each independently a single bond, carbonyl,

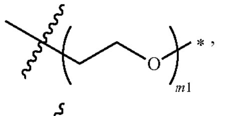

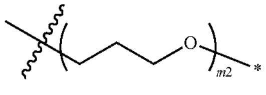 or

-continued

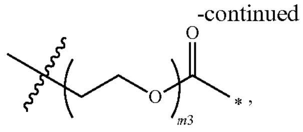

provided that one or more thereof are carbonyl or

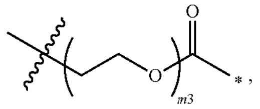

wherein m1, m2 and m3 are each independently an integer of 1 to 8,

is linked to an adjacent oxygen atom, —$*$ is linked to adjacent $R_1$, $R_2$, or $R_3$, $R_1$, $R_2$ and $R_3$ are each independently hydrogen, a linear or branched alkyl having 6 to 18 carbon atoms, or a linear or branched alkenyl having 6 to 18 carbon atoms, and n is an integer of 1 to 9.

The surfactant is mixed with the water-containing gel polymer, which is added such that the water-containing gel pulverization step may be easily accomplished without agglomeration.

The surfactant represented by Formula 2 is a nonionic surfactant and has excellent surface adsorption performance by hydrogen bonding force even with an unneutralized polymer, and therefore, it is suitable for realizing the desired agglomeration control effect. In contrast, when an anionic surfactant, not a nonionic surfactant, is mixed with a polymer neutralized with a neutralizing agent such as NaOH or $Na_2SO_4$, it is adsorbed via $Na^+$ ions ionized in carboxyl substituents of the polymer, and when mixed with the unneutralized polymer, there is a problem in that the adsorption efficiency for the polymer is relatively lowered due to competition with the anions of the carboxyl substituents of the polymer.

Specifically, in the surfactant represented by Formula 2, the hydrophobic functional group is the terminal functional groups, $R_1$, $R_2$, $R_3$ moieties (if not hydrogen), and the hydrophilic functional group includes a glycerol-derived moiety in the chain and a hydroxyl group at the terminal (when An is a single bond, and at the same time, when $R_n$ is hydrogen, n=1 to 3), wherein the glycerol-derived moiety and the terminal hydroxyl group are hydrophilic functional groups and serve to improve adsorption performance on the polymer surface. Accordingly, agglomeration of the superabsorbent polymer particles may be effectively suppressed.

In Formula 2, the hydrophobic functional groups, $R_1$, $R_2$, $R_3$ moieties (if not hydrogen) are each independently a linear or branched alkyl having 6 to 18 carbon atoms, or a linear or branched alkenyl having 6 to 18 carbon atoms. In this regard, when $R_1$, $R_2$, and $R_3$ moieties (if not hydrogen) are alkyl or alkenyl having less than 6 carbon atoms, there is a problem in that agglomeration of the pulverized particles may not be effectively controlled because the chain length is short. When $R_1$, $R_2$, and $R_3$ moieties (if not hydrogen) are alkyl or alkenyl having more than 18 carbon atoms, there may be problems in that the surfactant may not be effectively mixed with the polymer because its mobility is reduced, and the unit price of the composition is increased due to the increased cost of the surfactant.

Preferably, when $R_1$, $R_2$, and $R_3$ may be hydrogen or a linear or branched alkyl having 6 to 18 carbon atoms, they may be 2-methylhexyl, n-heptyl, 2-methylheptyl, n-octyl, n-nonyl, n-decanyl, n-undecanyl, n-dodecanyl, n-tridecanyl, n-tetradecanyl, n-pentadecanyl, n-hexadecanyl, n-heptadecanyl, or n-octadecanyl, or when $R_1$, $R_2$, and $R_3$ may be a linear or branched alkenyl having 6 to 18 carbon atoms, they may be 2-hexenyl, 2-heptenyl, 2-octenyl, 2-nonenyl, n-decenyl, 2-undecenyl, 2-dodecenyl, 2-tridecaeyl, 2-tetradecenyl, 2-pentadecenyl, 2-hexadecenyl, 2-heptadecenyl, or 2-octadecenyl.

The surfactant may be selected from compounds represented by the following Formula 2-1 to Formula 2-14:

[Formula 2-1]

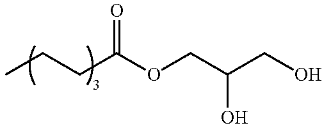

[Formula 2-2]

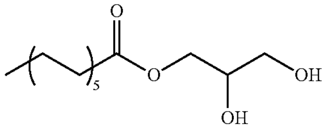

[Formula 2-3]

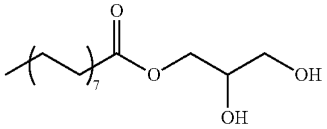

[Formula 2-4]

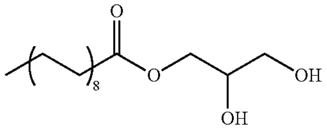

[Formula 2-5]

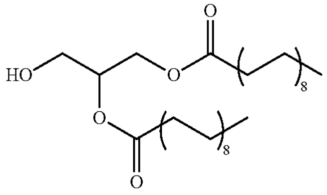

[Formula 2-6]

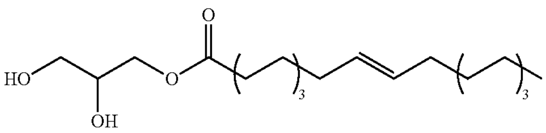

[Formula 2-7]

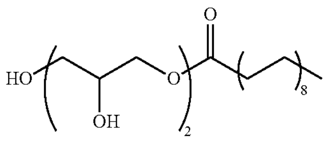

-continued

[Formula 2-8]

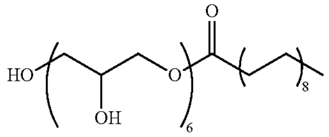

[Formula 2-9]

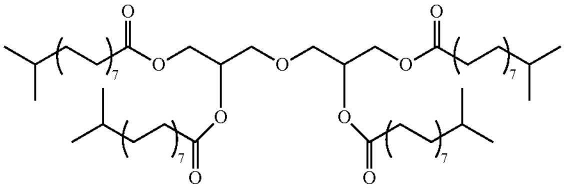

[Formula 2-10]

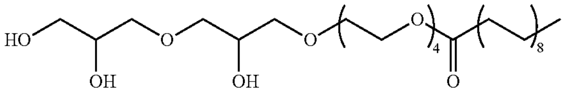

[Formula 2-11]

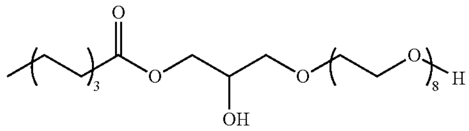

[Formula 2-12]

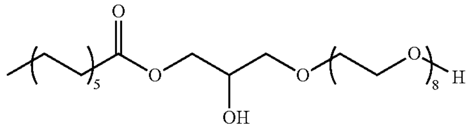

[Formula 2-13]

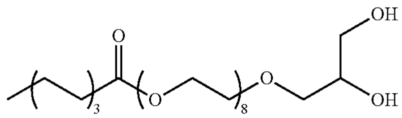

[Formula 2-14]

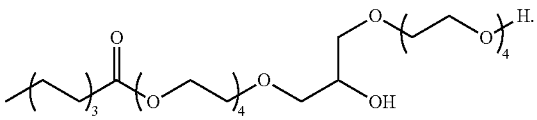

Meanwhile, the surfactant may be used in an amount of 0.01 part by weight to 10 parts by weight with respect to 100 parts by weight of the water-containing gel polymer. When the surfactant is used in an excessively small amount, it is not uniformly adsorbed onto the polymer surface, and thus re-agglomeration of particles may occur after pulverization. When the surfactant is used in an excessively large amount, the overall physical properties of the superabsorbent polymer finally prepared may deteriorate. For example, the surfactant may be used in an amount of 0.01 part by weight or more, or 0.015 parts by weight or more, or 0.1 part by weight or more, and 5 parts by weight or less, or 3 parts by weight or less, or 2 parts by weight or less, or 1 part by weight or less, or 0.5 parts by weight or less with respect to 100 parts by weight of the water-containing gel polymer.

A method of mixing the surfactant with the polymer is not particularly limited as long as it is a method capable of evenly mixing the surfactant with the polymer, and may be appropriately adopted and used. Specifically, the surfactant may be mixed in a dry manner, or mixed in a solution state after being dissolved in a solvent, or the surfactant may be melted and then mixed.

Among them, for example, the surfactant may be mixed in a solution state after being dissolved in a solvent. In this regard, any kind of solvent may be used without any limitation on inorganic or organic solvents, but water is most appropriate in consideration of the ease of the drying process and the cost of the solvent recovery system. In addition, a method of mixing the solution with the surfactant and the polymer in a reaction tank, a method of placing the polymer in a mixer and then spraying the solution thereto, or a method of continuously supplying the polymer and the solution to a mixer which is continuously operated, and then mixing them with each other may be used.

Meanwhile, with regard to the preparation method of the present invention, in Method 2 of the step 1, the process of neutralizing at least part of the acidic groups of the polymer and the process of preparing the primary pulverized water-containing gel polymer by primary water-containing gel pulverization of the water-containing gel polymer in the presence of the surfactant may be sequentially, or alternately, or simultaneously performed.

In other words, after neutralizing the acidic groups by adding a neutralizing agent to the polymer, the surfactant may be added to the neutralized polymer to perform primary water-containing gel pulverization of the polymer which is mixed with the surfactant, or the polymer may be subjected to neutralization and primary water-containing gel pulverization by simultaneously adding the neutralizing agent and the surfactant to the polymer. Alternatively, the surfactant may be first added, and then the neutralizing agent may be added. Alternatively, the neutralizing agent and the surfactant may be alternately added. Alternatively, the surfactant may be first added to perform primary water-containing gel pulverization, and then the neutralizing agent may be added to perform neutralization, and the surfactant may be further added to the neutralized water-containing gel polymer to further perform the primary water-containing gel pulverization process.

Meanwhile, for even neutralization of the entire polymer, it may be preferable to have a predetermined time difference between the addition of the neutralizing agent and the primary water-containing gel pulverization process.

Meanwhile, when the surfactant is added, at least part or a significant amount of the surfactant may be present on the surface of the primary pulverized water-containing gel polymer.

In this regard, the presence of the surfactant on the surface of the primary pulverized water-containing gel polymer means that at least part or a significant amount of the surfactant is adsorbed or bound onto the surface of the primary pulverized water-containing gel polymer particles. Specifically, the surfactant may be physically or chemically adsorbed onto the surface of the primary pulverized water-containing gel polymer. More specifically, the hydrophilic functional group of the surfactant may be physically adsorbed onto the hydrophilic moiety of the surface of the primary pulverized water-containing gel polymer by intermolecular forces such as dipole-dipole interaction. As described, the hydrophilic moiety of the surfactant is physically adsorbed onto the surface of the primary pulverized water-containing gel polymer to cover the surface, and the hydrophobic moiety of the surfactant is not adsorbed onto the surface of the polymer particles, and thus the primary pulverized water-containing gel polymer may be coated with the surfactant in a kind of micelle structure. This is because the surfactant is not added during the polymerization process of the water-soluble ethylenically unsaturated monomer, but is added in the primary water-containing gel pulverization step after the polymer is formed. The surfactant may fully perform its role, and pulverization and agglomeration occur at the same time to obtain particles with a large surface area by agglomeration of fine particles, as compared to the case where the surfactant is added during the polymerization process and the surfactant is present inside the polymer.

As described, by performing primary water-containing gel pulverization of the water-containing gel polymer after mixing the water-containing gel polymer and the surfactant or in the presence of the surfactant, the water-containing gel polymer in the form of secondary agglomerated particles may be prepared, in which the primary pulverized water-containing gel polymer and the surfactant in a mixed state are shredded and agglomerated.

The primary water-containing gel pulverization step may be performed such that the primary pulverized water-containing gel polymer has a particle size of the micrometer level, more specifically, such that the average particle diameter of the pulverized water-containing gel polymer is 1000 μm to 5000 μm, more specifically, 1000 μm to 3000 μm.

On the other hand, in the present invention, the average particle diameter of the water-containing gel polymer and the superabsorbent polymer particles may be determined according to the following Equation 1 by using particle sizes which are obtained after performing classification using classification sieves with various sieve mesh sizes according to the ASTM standard, and measuring the weight of the particles on the upper part of each classification sieve. Detailed measurement methods and measurement conditions are as described in Experimental Example below:

[Equation 1]

$$\text{Average particle diameter } (\mu m) = \sum_{i:n}\left\{\left(\frac{(n)^{th}\text{ classification sieve mesh size} + (n+1)^{th}\text{ classification sieve mesh size}}{2}\right)\times \left.\begin{matrix}\text{Weight of particles}\\ \text{on upper part}\\ \text{of } (n)^{th}\\ \text{classification sieve}\end{matrix}\right\}\right.$$

In the above Equation, n means the number of the classification process, and n is 1 or more and less than or equal to the total number of classification processes using the classification sieve.

Meanwhile, after the classification process using the classification sieve, a recovery process using a pan is performed. Since the pan does not have a mesh, the process using the pan is not included in the range of n. However, when the average particle diameter of the particles on the upper part of the classification sieve is obtained after the final classification process using the classification sieve, "$(n+1)^{th}$ classification sieve" in Equation 1 corresponds to the pan, and at this time, the size of the mesh in the pan is regarded as 0.

In addition, in the method for preparing the superabsorbent polymer according to the present invention, the primary water-containing gel pulverization step is performed by a micronizer (hereinafter, referred to as a 'first micronizer).

The first micronizer may include a body part including a transfer space through which the water-containing gel polymer is transferred; a screw member which is rotatably installed inside the transfer space to transfer the water-containing gel polymer; a driving motor providing a rotational driving force for the screw member; a cutter member which is installed in the body part to pulverize the water-containing gel polymer; and a perforated plate having a plurality of holes formed therein, which discharges the water-containing gel polymer pulverized by the cutter member to the outside of the body part.

In the present invention, as the primary water-containing gel pulverization step is performed in the presence of the surfactant, the water-containing gel polymer and the surfactant are mixed and introduced in the mixture form into the micronizer. Accordingly, in the body part of the first micronizer, the mixture of the water-containing gel polymer and the surfactant is transferred.

In addition, the particle size of the water-containing gel polymer to be pulverized may be controlled by changing the hole size (meaning the diameter of the hole) in the perforated plate. Specifically, the size of holes provided in the perforated plate of the micronizer may be 1 mm to 20 mm, more specifically, 1 mm to 10 mm, or 1 mm to 6 mm.

As described, when the water-containing gel polymer mixed with the surfactant is pulverized using the first micronizer, agglomeration between the pulverized water-containing gel polymers may be properly controlled, and the particle size and the particle diameter of the pulverized water-containing gel polymer may be reduced. In addition, the drying efficiency may be increased in the subsequent drying process by increasing the surface area of the water-containing gel polymer.

Step 3

Next, the step 3 is a step of preparing a primary dry water-containing gel polymer by drying the primary pulverized water-containing gel polymer.

Unlike the prior art, in the preparation method according to the present invention, the pulverization process is performed twice for the water-containing gel polymer. Accordingly, in order to perform the subsequent pulverization process, the primary pulverized water-containing gel polymer must have an optimal water content, and at the same time, uniform drying must be performed throughout the entire water-containing gel polymer particles. When the water-containing gel polymer is unevenly dried, the secondary water-containing gel pulverization process is impossible.

For this reason, in the present invention, the primary drying is performed in a moving type.

The moving type drying is distinguished from a fixed-bed type drying according to whether materials flow or not during drying. The moving type drying refers to a method of drying a product under mechanical stirring. At this time, the direction in which the hot air passes through the material may be the same as or different from the circulation direction of the material. Alternatively, the material may be dried by circulating the material inside the dryer, and passing a heating medium fluid (heating medium oil) through a separate pipe outside the dryer. In contrast, the fixed-bed type drying refers to a method in which a material to be dried is fixed on a floor such as a perforated iron plate through which air can pass, and is dried by passing hot air through the material from the bottom to top.

As described, in the moving type drying method, drying is performed while mechanically stirring the dry product, and therefore, in the primary water-containing gel pulverization process, the water-containing gel polymer that exists in the form of secondary particles, in which primary particles are agglomerated, becomes primary particles during primary drying, and it is possible to prevent agglomeration between the primary water-containing gel polymer particles. In addition, uniform drying of the entire water-containing gel polymer particles is possible, and drying may be completed within a short time.

As a device capable of drying by such a moving type drying, a moving type dryer commonly used, such as a horizontal-type mixer dryer, a rotary kiln, a paddle dryer, or a steam tube dryer, etc. may be used.

On the other hand, in the traditional method for preparing the superabsorbent polymer, the drying step is generally performed until the water content of the superabsorbent polymer is less than 10% by weight. However, in the present invention, the primary drying process is performed such that a ratio of the water content of the primary dry water-containing gel polymer to the water content of the water-containing gel polymer (=(water content of primary dry water-containing gel polymer/water content of water-containing gel polymer×100) is 45% to 80%.

Since the primary water-containing gel polymer has elasticity, it is not easy to pulverize. In particular, as the particle size is smaller, it is more difficult to pulverize. In the present invention, by performing the drying process to satisfy the above-described water content conditions, the water-containing gel polymer has appropriate strength, and thus it is easy to pulverize during subsequent secondary water-containing gel pulverization. As a result, not only the average particle diameter is reduced, but also the content of the water-containing gel polymer coarse particles having a large particle diameter, specifically, a particle diameter of 1400 μm or more, may be reduced.

When the water content of the primary dry water-containing gel polymer is less than 45% relative to the water content of the water-containing gel polymer, the water-containing gel polymer becomes too hard due to excessive drying, and thus it is difficult to pulverize during the subsequent secondary water-containing gel pulverization. In addition, when it exceeds 80%, it is still not easy to pulverize due to high elasticity. More specifically, the drying may be performed such that the ratio of the water content of the primary dry water-containing gel polymer to the water content of the water-containing gel polymer is 45% or more, or 47% or more, or 50% or more, or 55% or more, or 56.5% or more, and 80% or less, or 78% or less, or 75% or less, or 73% or less, or 70% or less.

Accordingly, during primary drying, the primary drying may be performed under conditions satisfying the above-mentioned range of the water content ratio by appropriately adjusting drying conditions such as drying temperature, drying time, etc. in consideration of the water content of the water-containing gel polymer, the amount of water-containing gel polymer, the kind of the moving type dryer, etc.

When the drying temperature is too low, the drying time may be prolonged until satisfying the above water content conditions, and processability may be deteriorated. In addition, when the drying temperature is too high, the water content of the water-containing gel polymer may be too low, and subsequent secondary water-containing gel pulverization may be difficult. In addition, when the drying time is too long, processability may be deteriorated, the water content of the water-containing gel polymer is lowered, and thus secondary water-containing gel pulverization may be difficult, and when the drying time is too short, sufficient drying is not achieved and subsequent secondary water-containing gel pulverization may be difficult. For example, the primary drying may be performed under conditions satisfying the above range of the water content ratio, at a temperature of 100° C. or higher, or 150° C. higher, and 300° C. or lower, or 250° C. or lower for 3 minutes or longer, or 5 minutes or longer, or 10 minutes or longer, and 20 minutes or shorter, or 15 minutes or shorter.

Further, in the preparation method according to the present invention, the drying employs the moving type drying method to control the rotation speed, thereby further improving the drying efficiency. For example, the rotation speed may be 1 rpm or more, or 3 rpm or more, or 5 rpm or more, or 8 rpm or more, and 20 rpm or less, or 15 rpm or less, or 12 rpm or less, or rpm or less. Within the above range, the rotation speed may be preferably determined by considering the water content of the water-containing gel polymer, the amount of the water-containing gel polymer, the kind of the moving type dryer, the drying conditions such as the drying temperature, the drying time, etc.

The primary dry water-containing gel polymer obtained through the above-described primary drying process satisfies the ratio of its water content to the water content of the water-containing gel polymer, as described above.

Furthermore, the primary dry water-containing gel polymer has a water content of 20% by weight to 50% by weight, more specifically 20% by weight or more, or 25% by weight or more, and 50% by weight or less, or 45% by weight or less, or 40% by weight or less, or 35% by weight or less, based on the total weight of the primary dry water-containing gel polymer. As described, as the primary dry water-containing gel polymer has the optimized water content, agglomeration between polymer particles may be reduced during the subsequent secondary water-containing gel pulverization process, and pulverization efficiency may be increased.

Step 4

The step 4 is a step of performing a secondary water-containing gel pulverization of the primary dry water-containing gel polymer of the step 3.

The secondary pulverization process may be performed such that the secondary pulverized water-containing gel polymer has an average particle diameter of 50% to 90%, or 60% to 80% relative to the average particle diameter of the primary pulverized water-containing gel polymer. More specifically, the process may be performed such that the secondary pulverized water-containing gel polymer has an average particle diameter of 700 μm to 1500 μm.

As the primary dry water-containing gel polymer is further pulverized by this secondary pulverization process, the particle size becomes smaller, the particle size may be further reduced by increasing the uniformity, and the amount of coarse particles having a particle size of 1400 μm or more among the obtained polymer particles may be greatly reduced. As a result, the amount of fine particles generated in the preparation process of the superabsorbent polymer may be greatly reduced, and the drying efficiency may be increased in the subsequent drying process by increasing the surface area of the secondary pulverized water-containing gel polymer.

The secondary water-containing gel pulverization step may be performed by a micronizer (hereinafter, referred to as a second micronizer) in the same manner as in the primary water-containing gel pulverization.

The second micronizer is the same as described in the first micronizer, and the particle size of the water-containing gel polymer to be secondarily pulverized may be controlled by changing the hole size in the perforated plate of the micronizer.

Specifically, the second micronizer may include a body part including a transfer space through which the primary dry water-containing gel polymer is transferred; a screw member which is rotatably installed inside the transfer space to transfer the water-containing gel polymer; a driving motor providing a rotational driving force for the screw member; a cutter member which is installed in the body part to pulverize the water-containing gel polymer; and a perforated plate having a plurality of holes formed therein, which discharges the water-containing gel polymer pulverized by the cutter member to the outside of the body part.

Meanwhile, the hole sizes of the perforated plates provided in the first and second micronizers used in the primary water-containing gel pulverization and the secondary water-containing gel pulverization may be the same as or different from each other.

For example, for easy pulverization, it is preferable that the hole size provided in the perforated plate of the second micronizer is smaller than the hole size provided in the perforated plate of the first micronizer. Specifically, the hole size provided in the perforated plate of the first micronizer may be 1 mm to 10 mm, and the hole size provided in the perforated plate of the second micronizer may be 0.5 mm to 6 mm. More specifically, the hole size provided in the perforated plate of the first micronizer may be 1 mm to 6 mm, or 2 mm to 5 mm, and the hole size provided in the perforated plate of the second micronizer may be 0.1 mm to 1 mm.

When the primary water-containing gel pulverization and the secondary water-containing gel pulverization are performed under the same conditions as described above, a particle size distribution the same as that of the product after drying may be realized, thereby further reducing the generation of fine particles.

Step 5

Next, the step 5 is a step of preparing a secondary dry water-containing gel polymer by drying the secondary pulverized water-containing gel polymer.

When the secondary drying process is not performed, it is difficult to perform subsequent processes, such as pulverization and classification, etc., due to the high water content of the secondary pulverized water-containing gel polymer.

The secondary drying is performed in the moving type drying method in order to prevent agglomeration between secondary pulverized water-containing gel polymer particles and to allow homogeneous drying of all particles.

As a device capable of drying by such a moving type drying manner, a moving type dryer commonly used, such as a horizontal-type mixer dryer, a rotary kiln, a paddle dryer, or a steam tube dryer, etc. may be used.

The secondary drying is preferably performed for a relatively long time at a low temperature, as compared to the primary drying. Specifically, the secondary drying may be performed at a temperature of 100° C. to 250° C. for 20 minutes to 60 minutes, more specifically, at a temperature of 100° C. or higher, or 150° C. or higher, or 180° C. or higher, and 250° C. or lower, or 230° C. or lower, or 200° C. lower for 20 minutes or longer, or 30 minutes or longer, and 60 minutes or shorter, or 40 minutes or shorter. When the secondary drying process is performed under the above conditions, the above-described water content conditions are satisfied, and homogeneous drying of all particles may be achieved.

In addition, as the secondary drying employs the moving type drying method, the drying efficiency may be further improved by controlling the rotation speed. For example, the rotation speed may be 1 rpm or more, or 3 rpm or more, or 5 rpm or more, or 8 rpm or more, and 20 rpm or less, or 15 rpm or less, or 12 rpm or less, or 10 rpm or less, and the rotation speed may be preferably determined by considering the water content of the water-containing gel polymer, the amount of the water-containing gel polymer, the kind of the moving type dryer, the drying conditions such as the drying temperature, the drying time, etc.

The secondary dry water-containing gel polymer obtained through the above-described secondary drying process has an average particle diameter smaller than that of a water-containing gel polymer obtained through the traditional water-containing gel pulverization process, and a proportion of polymers with large particles in the polymer is low.

Specifically, the secondary dry water-containing gel polymer has an average particle diameter of 900 μm to 1500 μm, and the content of the secondary dry water-containing gel polymer having a particle size of 1400 μm or more is 25% by weight or less with respect to the total weight of the secondary dry water-containing gel polymer. More specifically, the secondary dry water-containing gel polymer has an average particle diameter of 900 μm or more, or 950 μm or more, or 970 μm or more, and 1500 μm, or less, or 1300 μm or less, or 1280 μm or less, or 1200 μm or less, or 1150 μm or less, and the content of the secondary dry water-containing gel polymer having a particle size of 1400 μm or more is 25% by weight or less, or 20% by weight or less, or 19.9% by weight or less, or 10% by weight or less, or 5% by weight or less, or 3% by weight or less with respect to the total weight of the secondary dry water-containing gel polymer. It is more preferable that the content of the secondary dry water-containing gel polymer having a particle size of 1400 μm or more is lower, and thus the lower limit thereof is not particularly limited, but it may be, for example, 0.001% by weight or more, or by weight or more.

In addition, the content of the secondary dry water-containing gel polymer having a particle size of less than 150 μm, i.e., fine particles is less than 0.2% by weight, specifically, by weight or less with respect to the total weight of the secondary dry water-containing gel polymer. In general, the content of fine particles in the secondary dry water-containing gel polymer is almost the same as the content of fine particles in the superabsorbent polymer finally prepared by surface crosslinking treatment. Considering this, from the content of fine particles in the secondary dry water-containing gel polymer, it may be expected that the content of fine particles in the final surface-treated superabsorbent polymer is also significantly low at the above range of content. This result is in contrast to the result of the traditional preparation method, in which fine particles of about 10% by weight to about 20% by weight are generated when the superabsorbent polymer is prepared.

Step 6

Next, the step 6 is a step of preparing superabsorbent polymer particles by pulverizing the secondary dry water-containing gel polymer obtained in Step 5.

Specifically, the pulverization step may be performed such that the secondary dry water-containing gel polymer has a particle size at the normal particle size level, i.e., a particle size of 150 μm to 850 μm.

A pulverizer used therefor may specifically include a vertical pulverizer, a turbo cutter, a turbo grinder, a rotary cutter mill, a cutter mill, a disc mill, a shred crusher, a crusher, a chopper, and a disc cutter, but is not limited thereto.

Alternatively, as the pulverizer, a pin mill, a hammer mill, a screw mill, a roll mill, a disc mill, a jog mill, etc. may be used, but is not limited thereto.

On the other hand, in the preparation method of the present invention, it is possible to obtain the superabsorbent polymer particles having a narrower particle size distribution than those in the traditional chopping step, through the two water-containing gel pulverization steps, and thus even though the pulverization is performed under mild conditions with a lower pulverization power, the superabsorbent polymer having a very high content of the normal particle size may be prepared, and the generation rate of fine particles may be greatly reduced.

Additional Steps

The preparation method according to one embodiment of the present invention may further include the step of classifying the superabsorbent polymer particles according to the particle size, after obtaining the superabsorbent polymer particles.

In addition, the preparation method according to one embodiment of the present invention may further include the step of forming a surface crosslinked layer on at least part of the surface of the superabsorbent polymer particles in the presence of a surface crosslinking agent, after obtaining the superabsorbent polymer particles, or additionally, after classifying.

By the above step, the crosslinked polymer included in the dry superabsorbent polymer particles is further crosslinked via the surface crosslinking agent, and thus the surface crosslinking layer may be formed on at least part of the surface of the dry superabsorbent polymer particles.

As the surface crosslinking agent, any surface crosslinking agent that has been traditionally used for the preparation of superabsorbent polymers may be used without any particular limitation. For example, the surface crosslinking agent may include one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; one or more carbonate-based compounds selected from the group consisting of ethylene carbonate, propylene carbonate, and glycerol carbonate; an epoxy compound such as ethylene glycol diglycidyl ether, etc.; a polyamine compound; an oxazoline compound; a mono-, di- or poly-oxazolidinone compound; a cyclic urea compound; etc.

Specifically, as the surface crosslinking agent, one or more, or two or more, or three or more of the above-described surface crosslinking agents may be used. For example, ethylene carbonate, propylene carbonate, and propylene glycol may be used in a mixture.

Such a surface crosslinking agent may be used in an amount of 0.001 part by weight to 5 parts by weight with respect to 100 parts by weight of the dry superabsorbent polymer particles. More specifically, the surface crosslinking agent may be used in an amount of 0.001 part by weight or more, or 0.01 part by weight or more, or 0.1 part by weight or more, or 0.3 parts by weight or more, or 0.4 parts by weight or more, and 5 parts by weight or less, or 3 parts by weight or less, or 1 part by weight or less with respect to 100 parts by weight of the dry superabsorbent polymer particles. By controlling the content of the surface crosslinking agent at the above-mentioned range, a superabsorbent polymer exhibiting excellent absorption properties may be prepared.

In addition, the step of forming the surface-crosslinked layer may be performed by adding an inorganic material to the surface crosslinking agent. That is, the step of forming the surface-crosslinked layer by further crosslinking the surface of the superabsorbent polymer particles in the presence of the surface crosslinking agent and the inorganic material may be performed.

As the inorganic material, one or more inorganic materials selected from the group consisting of silica, clay, alumina, silica-alumina composite, titania, zinc oxide, and aluminum sulfate may be used. The inorganic material may be used in the form of powder or liquid, and particularly, in the form of alumina powder, silica-alumina powder, titania powder, or a nanosilica solution.

The inorganic material may be used in an amount of 0.001 part by weight to 1 part by weight, more specifically, 0.001 part by weight or more, or 0.01 part by weight or more, or 0.1 part by weight or more, and 1 part by weight or less, or 0.5 parts by weight or less with respect to 100 parts by weight of the dry superabsorbent polymer particles.

Further, a method of mixing the surface crosslinking agent with the superabsorbent polymer particles is not limited in view of its construction. For example, a method of feeding the surface crosslinking agent and the superabsorbent polymer particles to a reactor and mixing them with each other, a method of spraying the surface crosslinking agent onto the superabsorbent polymer particles, or a method of mixing the superabsorbent polymer particles and the surface crosslinking agent while continuously feeding them to a mixer which is continuously operated may be used.

When the surface crosslinking agent and the superabsorbent polymer particles are mixed, water and methanol may be mixed together and added. When water and methanol are added, there is an advantage in that the surface crosslinking agent may be uniformly dispersed in the superabsorbent polymer particles. Here, the amounts of water and methanol to be added may be appropriately controlled so as to induce uniform dispersion of the surface crosslinking agent, to prevent agglomeration of the superabsorbent polymer particles, and to optimize the surface penetration depth of the crosslinking agent at the same time.

The surface crosslinking process may be performed at a temperature of 80° C. to 250° C. More specifically, the surface crosslinking process may be performed at a temperature of 100° C. to 220° C., or 120° C. to 200° C. for about 20 minutes to about 2 hours, or about 40 minutes to about minutes. When satisfying the above-described conditions of the surface crosslinking process, the surface of the superabsorbent polymer particles may be sufficiently crosslinked to increase absorbency under pressure.

A means for raising temperature for the surface crosslinking reaction is not particularly limited. Heating may be performed by providing a heating medium or by directly providing a heat source. In this regard, the kind of the applicable heating medium may be a hot fluid, etc., such as steam, hot air, or hot oil, but is not limited thereto. The temperature of the heating medium to be provided may be properly controlled, taking into consideration the means of the heating medium, the heating rate, and the target temperature. Meanwhile, as the heat source to be directly provided, an electric heater or a gas heater may be used, but is not limited to the above-described examples.

In addition, the method for preparing the superabsorbent polymer according to the present invention may further include, after the step of forming the surface-crosslinked layer on at least part of the surface of the superabsorbent polymer particles, any one or more of a cooling step of cooling the superabsorbent polymer particles on which the surface-crosslinked layer is formed, a hydrating step of adding water to the superabsorbent polymer particles on which the surface-crosslinked layer is formed, and a post-treatment step of adding an additive to the superabsorbent polymer particles on which the surface-crosslinked layer is formed. In this regard, the cooling step, the hydrating step, and the post-treatment step may be performed sequentially or simultaneously.

In addition, in the post-treatment step, additives such as a liquid permeability improver, an anti-caking agent, a fluidity improver or an antioxidant may be optionally added, but the present invention is not limited thereto.

By selectively performing the cooling step, the hydrating step, and the post-treatment step, the water content of the final superabsorbent polymer may be improved, and a superabsorbent polymer article with higher quality may be manufactured.

According to the present invention, provided is a superabsorbent polymer prepared by the above preparation method.

The superabsorbent polymer prepared by the above preparation method may have the low content of fine particles even without a separate classification process, a high absorption rate, and a water retention capacity (CRC) and absorbency under pressure (AUP), which are general absorption properties, equal to or higher than those of the superabsorbent polymer prepared by the traditional method.

In addition, the superabsorbent polymer may have a uniform particle size distribution due to the narrow particle size distribution, and may have excellent liquid permeability, rewetting property, and absorption rate due to the low content of water-soluble components (EC).

Specifically, the superabsorbent polymer includes a polymer in which a water-soluble ethylenically unsaturated monomer having acidic groups and an internal crosslinking agent are crosslinking-polymerized, in which at least part of the acidic groups are neutralized. In addition, the superabsorbent polymer may further include a surface-crosslinked layer formed on the polymer by further crosslinking the polymer via a surface crosslinking agent.

The superabsorbent polymer may have a water retention capacity (CRC) in the range of about 30 g/g or more, or about 35 g/g or more, or about 37 g/g or more, and about 50 g/g or less, or about 45 g/g or less, or about 40 g/g or less, as measured according to the EDANA standard WSP 241.3 method.

Further, the superabsorbent polymer may have an absorption rate (vortex time) of 100 seconds or less, or 90 seconds or less, or 85 seconds or less, or 50 seconds or less, or 30 seconds or less. As the value of the absorption rate is smaller, it is superior, and thus the lower limit of the absorption rate is 0 second in theory. For example, it may be about 5 seconds or more, or about 10 seconds or more, or about 12 seconds or more.

The absorption rate is defined as a time (unit: second) taken for a liquid vortex to disappear by rapid absorption, when the superabsorbent polymer is added to physiological saline, followed by stirring. As the time is shorter, the superabsorbent polymer may be regarded as having a higher initial absorption rate.

Hereinafter, preferred exemplary embodiments are provided for better understanding of the present invention. However, the following exemplary embodiments are only for illustrating the present invention, and the content of the present invention is not limited by the following exemplary embodiments.

EXAMPLE 1

Preparation of Water-Containing Gel Polymer

In a glass reactor, 100 g of acrylic acid, 130 g of 31.5 wt % caustic soda (NaOH) solution, 0.15 g of polyethylene glycol diacrylate as an internal crosslinking agent, 0.2 g of sodium persulfate as a thermal polymerization initiator, 0.01 g of diphenyl(2,4,6-trimethylbenzoyl)phosphine oxide as a photo-polymerization initiator, and 45 g of water were mixed to prepare a monomer composition.

The monomer composition was placed in a square reaction vessel of 30 cm in width and 30 cm in height, and a polymerization reaction was allowed for 60 seconds by irradiating UV at a density of 10 $mW/cm^2$ to obtain a water-containing gel polymer (water content=44.3% by weight).

Primary Water-Containing Gel Pulverization

The water-containing gel polymer prepared in the step 1 was cut to a size of 5 cm in width and 5 cm in height. As a surfactant, glycerol mono laurate (GML) was dissolved in water at a high temperature of 60° C. to prepare a 5 wt % aqueous solution, and 0.3 parts by weight thereof was mixed with respect to 100 parts by weight of the water-containing gel polymer. Then, primary water-containing gel pulverization was performed by putting the mixture into a first micronizer (F200, Karl Schnell) equipped with a perforated plate containing a number of holes with a hole size of 2 mm. At this time, the first micronizer was rotated at 1500 rpm.

Primary Drying

The primary pulverized water-containing gel polymer was dried at 250° C. for 5 minutes at a rotation speed of 10 rpm using a rotary kiln moving type dryer (manufactured by WOONGBI MACHINERY CO., LTD.), and then the primary dry water-containing gel polymer was recovered.

Secondary Water-Containing Gel Pulverization

Secondary water-containing gel pulverization was performed by putting the primary dry water-containing gel polymer into a second micronizer (F200, Karl Schnell) equipped with a perforated plate containing a number of holes with a hole size of 1 mm. At this time, the second micronizer was rotated at 1500 rpm.

Secondary Drying

The secondary pulverized water-containing gel polymer obtained in the step 2 was dried at 200° C. for 30 minutes at a rotation speed of 10 rpm using a rotary kiln moving type dryer (manufactured by WOONGBI MACHINERY CO., LTD.), and then the secondary dry water-containing gel polymer was recovered.

Pulverization

The secondary dry water-containing gel polymer was pulverized to particles having a particle diameter of 150 μm to 850 μm using a two-stage roll mill (GRAN-U-LIZER™, MPE). At this time, in the two-stage roll mill, the gap between the rolls in the first stage (upper stage) was 0.3 mm, and the gap between the rolls in the second stage (lower stage) was 0.2 mm.

Classifying

Only superabsorbent polymer particles having a particle diameter of 150 μm to 850 μm were selectively recovered from the pulverized product using a classification sieve.

Surface-Crosslinking

To 100 g of the superabsorbent polymer particles thus obtained, a surface crosslinking solution prepared by mixing 4.8 g of water, 0.1 g of propylene glycol, 0.8 g of ethylene carbonate, 0.8 g of propylene carbonate, and 0.87 g of a 23% aqueous aluminum sulfate solution was added and mixed for 2 minutes, and dried at 185° C. for 60 minutes to prepare a final superabsorbent polymer.

EXAMPLE 2

A superabsorbent polymer was prepared in the same manner as in Example 1, except that the drying process in the primary drying step of Example 1 was performed for 3 minutes.

EXAMPLE 3

A superabsorbent polymer was prepared in the same manner as in Example 1, except that the drying process in the primary drying step of Example 1 was performed for 7 minutes.

EXAMPLE 4

A superabsorbent polymer was prepared in the same manner as in Example 1, except that the drying process in the primary drying step of Example 1 was performed for 2 minutes.

EXAMPLE 5

100 g of acrylic acid, 0.35 g of pentaerythritol triallyl ether as an internal crosslinking agent, and 226 g of water were mixed under stirring in a 2 L glass container equipped with a stirrer and a thermometer. At this time, the reaction temperature was maintained at 5° C. Nitrogen of 1000 cc/min was injected into the resulting mixture for 1 hour. Thereafter, 1.3 g of 0.3% aqueous hydrogen peroxide solution as a polymerization initiator, 1.5 g of 1% aqueous ascorbic acid solution, and 3.0 g of 2% aqueous 2,2'-azobis amidinopropane dihydrochloride solution were injected, and at the same time, 1.5 g of 0.01% aqueous iron sulfate solution as a reducing agent was added and mixed. After the polymerization reaction in the resulting mixture started and the temperature of the polymer reached 85° C., the polymerization was allowed in an oven at 90±2° C. for about 6 hours to prepare a water-containing gel polymer.

A superabsorbent polymer was prepared in the same manner as in Example 1, except that the above prepared water-containing gel polymer was used.

Comparative Example 1

The same method as in Example 1 was performed, except that after the primary water-containing gel pulverization process, the primary drying process of the primary pulverized water-containing gel polymer was not performed in Example 1.

Comparative Example 2

The same method as in Example 1 was performed, except that after the secondary water-containing gel pulverization process, the secondary drying process of the secondary pulverized water-containing gel polymer was not performed in Example 1.

However, due to the high water content of the secondary pulverized water-containing gel polymer, it was difficult to perform post-processing such as pulverization, classification, etc.

Comparative Example 3

The same method as in Example 1 was performed, except that the surfactant was not added during the primary water-containing gel pulverization of the water-containing gel polymer in Example 1.

However, the water-containing gel polymer did not pass through the first micronizer due to the absence of surfactant, and thus the primary water-containing gel pulverization was difficult.

Comparative Example 4

The same method as in Example 1 was performed, except that after the primary water-containing gel pulverization, the primary pulverized water-containing gel polymer was subjected to the drying process in a fixed-bed type drying manner using a vented dryer including a perforated plate in Example 1.

However, subsequent processes such as secondary drying, etc. were impossible due to non-uniform drying.

Comparative Example 5

The same method as in Example 1 was performed, except that drying was performed using a rotary kiln moving type dryer for 10 minutes in the primary drying step of Example 1.

However, after the primary drying, the water content of the water-containing gel polymer became too low, and thus the secondary water-containing gel pulverization process was impossible.

Comparative Example 6

The same method as in Example 1 was performed, except that drying was performed using a rotary kiln moving type dryer for 1 minute in the primary drying step of Example 1.

Experimental Example 1

To observe changes according to the drying process during the water-containing gel pulverization process of the water-containing gel polymer, the water content of the water-containing gel polymer, the water content of the primary dry water-containing gel polymer, and the particle size and average particle diameter of the secondary dry water-containing gel polymer were measured by the following methods, respectively. The results are shown in Table 1 below.

Unless otherwise indicated, all of the following physical properties were evaluated at constant temperature and constant humidity (23±1° C., relative humidity 50±10%).

(1) Water Content (% by Weight) of Water-Containing Gel Polymer and Primary Dry Water-Containing Gel Polymer Each of the water-containing gel polymers of Examples and Comparative Examples was heated and dried at 180° C. by irradiating with infrared rays, and the weight of each water-containing gel polymer before and after heating was measured, and then the water content was obtained according to Equation 2 below. At this time, the drying conditions were determined as follows: the drying temperature was increased from room temperature to about 180° C. and then the temperature was maintained at 180° C., and the total drying time was set to 40 minutes, including 5 minutes for the temperature rising step.

$$\text{Water content (\% by weight)} = [(Ao - At)/Ao] \times 100 \quad (2)$$

in Equation 2, At represents the weight of the water-containing gel polymer after drying, and Ao represents the weight of the water-containing gel polymer before drying.

Further, heating and drying processes were performed in the same manner as above, except that the primary dry water-containing gel polymers of Examples and Comparative Examples were used, respectively. The weight of each water-containing gel polymer before/after heating was measured, and the water content was obtained according to Equation 2.

(2) Particle Size and Average Particle Diameter of Secondary Dry Water-Containing Gel Polymer Particle size and average particle diameter were measured for the secondary dry water-containing gel polymers of Examples and Comparative Examples.

In detail, as classification sieves, ASTM standard sieves having a mesh size of 4000 μm, 2000 μm, 1400 μm, 850 μm, 710 μm, 600 μm, 300 μm, or 150 μm were prepared, and the classification sieves were placed according to the mesh size such that the classification process may be performed in the order below. Then, the vibration was applied for 10 minutes with an amplitude of 1.5 mm, and classification was performed on the secondary dry water-containing gel polymer particles of Examples and Comparative Examples. After the classification was completed, the particle size distribution was expressed as a percentage by measuring the weight of particles on the upper part of each classification sieve. In addition, the average particle diameter was calculated according to the following Equation 1 using the measured weight of particles on the upper part of each classification sieve.

(Classification Processing Order)

4000 μm→2000 μm→1400 μm→850 μm→710 μm→600 μm→300 μm→150 μm→pan

[Equation 1]

$$\text{Average particle diameter } (\mu m) = \sum_{i:n}\left\{\left(\frac{(n)^{th}\text{ classification sieve mesh size} + (n+1)^{th}\text{ classification sieve mesh size}}{2}\right) \times \text{Weight of particles on upper part of } (n)^{th}\text{ classification sieve}\right\}$$

In the above Equation, n means the number of the classification process, and n is 1 or more and less than or equal to the total number of classification processes using the classification sieve. In the present Experimental Example, n is an integer of 1 to 8.

When the average particle diameter of the particles on the upper part of the classification sieve, which were classified using the classification sieve with a mesh size of 150 μm, wherein n is 8, is obtained, "the mesh size of $(n+1)^{th}$ classification sieve" in Equation 1 corresponds to the mesh size of the pan in the last order, and since the pan has no mesh, it is regarded as 0.

TABLE 1

| | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| Water content of water-containing gel polymer (wt %) | | 44.3 | 44.3 | 44.3 | 44.3 | 69.5 | 44.3 | 44.3 | 44.3 | 44.3 | 44.3 | 44.3 |
| Primary water-containing gel pulverization (○/X) | | ○ | ○ | ○ | ○ | ○ | ○ | ○ | X | ○ | ○ | ○ |
| Primary drying process (○/X) | | ○ | ○ | ○ | ○ | ○ | X | ○ | X | ○[1)] | ○ | ○ |
| Water content of primary dry water-containing gel polymer (wt %) | | 25.2 | 32.0 | 20.9 | 34.5 | 42.7 | 44.3 | 25.2 | ND | ND[2)] | 18.9 | 39.7 |
| Ratio (%) of Water content of primary dry water-containing gel polymer/Water content of water-containing gel polymer | | 56.9 | 72.2 | 47.2 | 77.9 | 61.5 | 100 | 56.9 | ND | ND | 42.7 | 89.6 |
| Secondary water-containing gel pulverization (○/X) | | ○ | ○ | ○ | ○ | ○ | ○ | ○ | X | X | X | ○ |
| Secondary drying process (○/X) | | ○ | ○ | ○ | ○ | ○ | ○ | X | X | X | X | ○ |
| Particle size distribution (wt %) of secondary dry water-containing gel polymer | 4000 μm or more | 0.0 | 0.0 | 0.0 | 0.0 | 0.0 | 0.0 | ND | ND | ND | ND | 0.0 |
| | Less than 4000 μm to 2000 μm or more | 0.1 | 1.0 | 0.1 | 1.5 | 0.7 | 2.1 | ND | ND | ND | ND | 1.6 |
| | Less than 2000 μm to 1400 μm or more | 2.2 | 18.9 | 0.9 | 22.6 | 5.7 | 30.5 | ND | ND | ND | ND | 27.3 |
| | Less than 1400 μm to 850 μm or more | 62.3 | 55.8 | 63.0 | 55.3 | 57.6 | 54.2 | ND | ND | ND | ND | 54.5 |
| | Less than 850 μm to 600 μm or more | 24.8 | 16.7 | 25.4 | 16.2 | 23.2 | 10.5 | ND | ND | ND | ND | 13.2 |
| | Less than 600 μm to 300 μm or more | 9.9 | 7.1 | 10.1 | 4.1 | 12.1 | 2.5 | ND | ND | ND | ND | 2.9 |
| | Less than 300 μm to 150 μm or more | 0.6 | 0.4 | 0.4 | 0.3 | 0.6 | 0.2 | ND | ND | ND | ND | 0.3 |
| | Less than 150 μm | 0.1 | 0.1 | 0.1 | 0.0 | 0.1 | 0.0 | ND | ND | ND | ND | 0.2 |
| Average particle diameter (μm) of secondary dry water-containing gel polymer | | 967 | 1133 | 958 | 1188 | 990 | 1279 | ND | ND | ND | ND | 1235 |

In Table 1, "ND" means not determined.

In Table 1, 1) the primary drying process in Comparative Example 4 was performed in a fixed-bed type drying manner In Table 1, 2) during the primary drying process in Comparative Example 4, it was impossible to measure the water content of the primary dry water-containing gel polymer due to non-uniform drying.

Examples 1 and 2, in which the ratio of the water content of the primary dry water-containing gel polymer to the water content of the water-containing gel polymer satisfied the optimal range, showed a decrease in the average particle diameter of the secondary dry water-containing gel polymer, and also showed a great decrease in the content of the water-containing gel polymer having a particle size of 1400 μm in the entire particles, as compared with Comparative Example 1, in which the water-containing gel polymer was pulverized without the drying process.

In contrast, in the reference example, in which the ratio of the water content of the primary dry water-containing gel polymer to the water content of the water-containing gel polymer did not satisfy the optimal range by performing the drying process for an excessively long time after primary water-containing gel pulverization of the water-containing gel polymer, the secondary water-containing gel pulverization process could not be performed because the water-containing gel polymer was too hard.

According to these results, when the drying process was performed between the water-containing gel pulverization processes of the water-containing gel polymer in order to achieve an optimal range of the water content, the average particle size of the water-containing gel polymer was decreased and the content of the water-containing gel polymer having a large particle size was decreased. Accordingly, it is expected that generation of fine particles during the subsequent pulverization process will be reduced.

Experimental Example 2

The final surface-crosslinked superabsorbent polymers prepared in Examples and Comparative Examples were evaluated for absorption performances by the following methods.

Unless otherwise indicated, all of the following physical properties were evaluated at constant temperature and constant humidity (23±1° C., relative humidity of 50±10%), and physiological saline or saline means 0.9% by weight of an aqueous sodium chloride (NaCl) solution.

In addition, unless otherwise indicated, evaluation of the physical properties of the final surface-crosslinked superabsorbent polymers was performed on the polymers having a particle diameter of 150 μm to 850 μm, which were classified through the ASTM standard sieves.

(1) Centrifuge Retention Capacity (CRC)

The water retention capacity by absorption capacity under no load was measured for the superabsorbent polymers prepared in Examples and Comparative Examples in accordance with European Disposables and Nonwovens Association standard EDANA WSP 241.3.

In detail, each superabsorbent polymer $W_0$(g) (about 0.2 g) obtained in Examples and Comparative Examples was put in a nonwoven fabric-made bag, followed by sealing. The bag was immersed in physiological saline (0.9 wt %) at room temperature. After 30 minutes, the bag was dehydrated by using a centrifuge at 250 G for 3 minutes, and then the weight $W_2$ (g) of the bag was measured. Further, after carrying out the same operation without using the polymer, the weight $W_1$(g) of the bag was measured.

CRC (g/g) was calculated using the obtained weights according to the following Equation 3:

$$CRC\ (g/g)=\{[W_2(g)-W_1(g)]/W_0(g)\}-1 \quad (3)$$

(2) Absorption Rate (Vortex Time, Sec)

The absorption rate (vortex time) was measured in seconds according to the method described in International Publication WO 1987-003208.

In detail, 2 g of the superabsorbent polymer was added to 50 mL of physiological saline at 23° C. to 24° C., and stirred with a magnetic bar (diameter of 8 mm and length of 30 mm) at 600 rpm, and a time taken for vortex to disappear was measured in seconds to calculate the absorption rate.

(3) Generation of Fine Particles

The secondary dry water-containing gel polymers prepared in Examples and Comparative Examples were pulverized using a roll mill (MPE, 66F model), respectively. At this time, the gap between the roll mills was set to 0.15 mm.

Thereafter, as classification sieves, ASTM standard sieves having a mesh size of 4000 μm, 2000 μm, 1400 μm, 850 μm, 710 μm, 600 μm, 300 μm, or 150 μm were prepared, and the classification sieves were placed according to the mesh size such that the classification process may be performed in the order below. Then, the vibration was applied for 10 minutes with an amplitude of 1.5 mm, and classification was performed on the pulverized water-containing gel polymer particles. After the classification was completed, the weight of fine particles having a particle size of less than 150 μm was measured, and expressed as a percentage, based on the total weight of the secondary dry water-containing gel polymer, according to the following Equation 4.

(Classification Processing Order)

4000 μm→2000 μm→1400 μm→850 μm→710 μm→600 μm→300 μm→150 μm→pan

Generation of fine particles (% by weight)=[Weight of fine particles having particle size of less than 150 μm/Total weight of secondary dry water-containing gel polymer]×100 (4)

TABLE 2

| | Example 1 | Example 2 | Example 3 | Example 4 | Example 5 | Comparative Example 1 | Comparative Example 6 |
|---|---|---|---|---|---|---|---|
| CRC (g/g) | 39.2 | 39.4 | 38.9 | 39.1 | 37.2 | 38.9 | 38.8 |
| Voltex (s) | 86 | 84 | 84 | 85 | 28 | 85 | 83 |
| Amount of fine particles generated (% by weight) | 6.8 | 7.5 | 6.7 | 8.1 | 8.2 | 9.7 | 9.4 |

The invention claimed is:

1. A method for preparing a superabsorbent polymer, comprising:

forming a water-containing gel polymer, by a crosslinking-polymerization of a water-soluble ethylenically unsaturated monomer having acidic groups and an internal crosslinking agent;

preparing a primary pulverized water-containing gel polymer by performing a primary water-containing gel pulverization of the water-containing gel polymer in the presence of a surfactant;

preparing a primary dry water-containing gel polymer by a primary drying by moving the primary pulverized water-containing gel polymer;

preparing a secondary pulverized water-containing gel polymer by performing a secondary water-containing gel pulverization of the primary dry water-containing gel polymer;

preparing a secondary dry water-containing gel polymer by a secondary drying by moving the secondary pulverized water-containing gel polymer;

and preparing superabsorbent polymer particles by pulverizing the secondary dry water-containing gel polymer, wherein the primary drying is performed such that a ratio of a water content of the primary dry water-containing gel polymer to a water content of the water-containing gel polymer formed during the forming step is 45% to 80%.

2. The method for preparing a superabsorbent polymer according to claim 1, wherein the primary drying is performed such that the ratio of the water content of the primary dry water-containing gel polymer to the water content of the water-containing gel polymer is 47% to 78%.

3. The method for preparing a superabsorbent polymer according to claim 1, wherein the primary drying is performed at 100° C. to 300° C. for 5 minutes to 20 minutes.

4. The method for preparing a superabsorbent polymer according to claim 1, wherein the water content of the primary dry water-containing gel polymer is 20% by weight to 50% by weight with respect to a total weight of the primary dry water-containing gel polymer.

5. The method for preparing a superabsorbent polymer according to claim 1, wherein the secondary drying is performed at 100° C. to 250° C. for 20 minutes to 60 minutes.

6. The method for preparing a superabsorbent polymer according to claim 1, wherein the primary drying and the secondary drying are performed using a horizontal mixer dryer, a rotary kiln, a paddle dryer, or a steam tube dryer, respectively.

7. The method for preparing a superabsorbent polymer according to claim 1, wherein the secondary dry water-containing gel polymer has an average particle diameter of 900 μm to 1500 μm, and a content of the secondary dry water-containing gel polymer having a particle size of 1400 μm or more is 25% by weight or less with respect to a total weight of the secondary dry water-containing gel polymer.

8. The method for preparing a superabsorbent polymer according to claim 1, wherein the primary water-containing gel pulverization and the secondary water-containing gel pulverization are performed using a first micronizer and a second micronizer, respectively, the first micronizer and the second micronizer each including a body part comprising a transfer space through which the water-containing gel polymer is transferred;

a screw member which is rotatably installed inside the transfer space to transfer the water-containing gel polymer;

a driving motor providing a rotational driving force for the screw member;

a cutter member which is installed in the body part to pulverize the water-containing gel polymer; and a perforated plate having a plurality of holes formed therein, which discharges the water-containing gel polymer pulverized by the cutter member to an outside of the body part.

9. The method for preparing a superabsorbent polymer according to claim 8, wherein a size of holes in the perforated plate of the second micronizer is smaller than a size of holes provided in the perforated plate of the first micronizer.

10. The method for preparing a superabsorbent polymer according to claim 9, wherein the size of holes in the perforated plate of the first micronizer is 1 mm to 10 mm, and the size of holes in the perforated plate of the second micronizer is 0.5 mm to 6 mm.

11. The method for preparing a superabsorbent polymer according to claim 1, wherein the surfactant includes a compound represented by Chemical Formula 2 or a salt thereof:

[-Chemical Formula 2-]

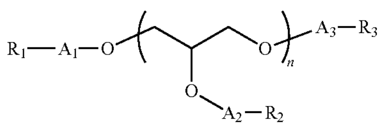

wherein, in Chemical Formula 2, $A_1$, $A_2$ and $A_3$ are each independently a single bond, carbonyl,

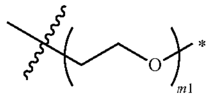
,

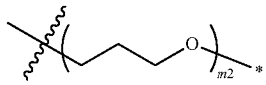
or

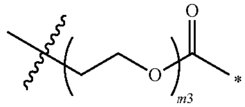
, wherein m1, m2 and m3 are each independently an integer of 1 to 8

is linked to an adjacent oxygen atom, ——* is linked to adjacent $R_1$, $R_2$, or $R_3$, provided that one or more thereof are carbonyl or

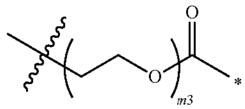
, $R_1$, $R_2$ and $R_3$ are each independently hydrogen, a linear or branched alkyl having 6 to 18 carbon atoms, or a linear or branched alkenyl having 6 to 18 carbon atoms, and n is an integer of 1 to 9.

12. The method for preparing a superabsorbent polymer according to claim 1, wherein the forming the water-containing gel polymer comprises:

neutralizing at least part of the acidic groups of the water-soluble ethylenically unsaturated monomer, and polymerization of a monomer composition including the water-soluble ethylenically unsaturated monomer having at least partially neutralized acidic groups, an internal crosslinking agent, and a polymerization initiator.

13. The method for preparing a superabsorbent polymer according to claim 1, wherein the water content of the water-containing gel polymer is 30% by weight to 80% by weight with respect to a total weight of the water-containing gel polymer.

14. The method for preparing a superabsorbent polymer according to claim 1, further comprising the step of classifying the superabsorbent polymer particles according to the particle size, after the step of preparing the superabsorbent polymer particles.

15. The method for preparing a superabsorbent polymer according to claim 1, further comprising the step of forming a surface-crosslinked layer on at least part of the surface of the superabsorbent polymer particles, after the step of preparing the superabsorbent polymer particles.

16. The method for preparing a superabsorbent polymer according to claim 1, wherein the forming the water-containing gel polymer comprises:

polymerization of a monomer composition including the water-soluble ethylenically unsaturated monomer having acidic groups, the internal crosslinking agent, and a polymerization initiator to form a polymer in which the water-soluble ethylenically unsaturated monomer having acidic groups and the internal crosslinking agent are crosslinking-polymerized; and neutralizing at least part of the acidic groups of the polymer to form the water-containing gel polymer.

* * * * *